US012535914B2

(12) United States Patent
Kim et al.

(10) Patent No.: US 12,535,914 B2
(45) Date of Patent: Jan. 27, 2026

(54) DISPLAY DEVICE AND MOBILE ELECTRONIC DEVICE INCLUDING THE SAME

(71) Applicant: SAMSUNG DISPLAY CO., LTD., Yongin-si (KR)

(72) Inventors: Soo Won Kim, Yongin-si (KR); Gwang Bum Ko, Yongin-si (KR); Mi Hee Son, Yongin-si (KR); Young Seok Yoo, Yongin-si (KR); Joo Hyeon Jeong, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/811,294

(22) Filed: Aug. 21, 2024

(65) Prior Publication Data

US 2025/0138677 A1 May 1, 2025

(30) Foreign Application Priority Data

Oct. 31, 2023 (KR) ........................ 10-2023-0147786

(51) Int. Cl.
*G06F 3/041* (2006.01)
*G06F 3/044* (2006.01)

(52) U.S. Cl.
CPC ........ *G06F 3/04184* (2019.05); *G06F 3/0412* (2013.01); *G06F 3/044* (2013.01)

(58) Field of Classification Search
CPC .... G06F 3/04184; G06F 3/0412; G06F 3/044; G06F 3/04166; G06F 3/0418; G06F 3/04182; G06F 3/0443; G06F 3/0446
See application file for complete search history.

(56) References Cited

U.S. PATENT DOCUMENTS

| 2011/0096011 A1* | 4/2011 | Suzuki | G06F 3/04186 345/173 |
| 2015/0261356 A1* | 9/2015 | Shepelev | G06F 3/0446 345/174 |
| 2016/0162118 A1* | 6/2016 | Gur | G06F 3/0441 345/174 |
| 2017/0115820 A1* | 4/2017 | Zhao | G06F 3/04166 |
| 2018/0136778 A1* | 5/2018 | Choi | G06F 3/044 |

(Continued)

FOREIGN PATENT DOCUMENTS

KR 10-2411704 B1 6/2022

*Primary Examiner* — Hong Zhou
(74) *Attorney, Agent, or Firm* — F. CHAU & ASSOCIATES, LLC

(57) ABSTRACT

A display device includes a display panel, a sensor unit overlapping the display panel and including a plurality of touch driving electrodes, a plurality of touch sensing electrodes, and a plurality of noise sensing electrodes, and a touch driving circuit supplying a driving signal to the plurality of touch driving electrodes and receiving a touch sensing signal from the plurality of touch sensing electrodes. The touch driving circuit is configured to receive a noise level signal indicating a noise level of the display panel from a host that generates image data, select at least some noise sensing channels among a plurality of noise sensing channels connected to the plurality of noise sensing electrodes, based on the noise level signal, receive a noise signal using at least some of the selected noise sensing channels, and compensate for the touch sensing signal using the received noise signal.

20 Claims, 18 Drawing Sheets

(56) References Cited

U.S. PATENT DOCUMENTS

| | | | | |
|---|---|---|---|---|
| 2018/0329555 A1* | 11/2018 | Kim | ...................... | G06F 3/0418 |
| 2020/0409491 A1* | 12/2020 | Maharyta | .............. | G06F 3/0446 |
| 2021/0132719 A1* | 5/2021 | Park | ....................... | H10K 50/84 |
| 2022/0317854 A1* | 10/2022 | Lee | ..................... | G06F 3/04184 |
| 2022/0326831 A1* | 10/2022 | Lee | .................... | G06F 3/04166 |
| 2023/0134597 A1* | 5/2023 | Na | ........................ | G06F 3/0443 |
| | | | | 345/173 |

* cited by examiner

☐ : 1201
▨ : 1202

☐ : 1201
☐ : 1202
☐ : 1203
■ : 1204

DISPLAY DEVICE AND MOBILE ELECTRONIC DEVICE INCLUDING THE SAME

CROSS-REFERENCE TO RELATED APPLICATION

This application claims priority under 35 U.S.C. § 119 to Korean Patent Application No. 10-2023-0147786 filed on Oct. 31, 2023 in the Korean Intellectual Property Office, the contents of which in its entirety are herein incorporated by reference.

TECHNICAL FIELD

The present disclosure relates to a display and, more specifically, to a display device and a mobile electronic device including the same.

DISCUSSION OF THE RELATED ART

Electronic devices such as smartphones, tablet computers, digital cameras, notebook/laptop computers, navigation systems, and smart televisions that provide images to users generally include display devices for displaying images. The display devices include a display panel that generates and displays an image and various input devices may also be incorporated into the display panel.

Recently, touch sensors that recognize touch input have been widely applied to the display devices, especially smartphones and tablet computers. The touch sensors are increasingly replacing existing physical input devices such as keypads due to the convenience of touch.

A screen size of the display device is increasing, and as the screen size of the display device increases, the display panel is more likely to generate noise that might adversely affect the sensitivity of the touch sensor.

SUMMARY

A display device includes a display panel, a sensor unit overlapping the display panel and including a plurality of touch driving electrodes, a plurality of touch sensing electrodes, and a plurality of noise sensing electrodes, and a touch driving circuit configured to supply a driving signal to the plurality of touch driving electrodes and receive a touch sensing signal from the plurality of touch sensing electrodes. The touch driving circuit is configured to receive a noise level signal indicating a noise level of the display panel from a host that generates image data, select at least some noise sensing channels among a plurality of noise sensing channels connected to the plurality of noise sensing electrodes, based on the noise level signal, receive a noise signal using at least some of the selected noise sensing channels, and compensate for the touch sensing signal using the received noise signal.

The host may be configured to determine whether a mobile electronic device to which the display device is applied is in a designated state, and may be configured to determine the noise level based on the determined designated state of the mobile electronic device. The designated state may include a state in which an electrical charger (e.g., a travel adapter) is connected to the mobile electronic device.

The noise level signal may include a vertical synchronization signal with variable amplitude.

The vertical synchronization signal may have a first amplitude when the noise level is a first level, and have a second amplitude when the noise level is a second level that is higher than the first level.

The host may be configured to determine whether a screen according to the image data is a specific screen, and may be configured to determine the noise level of the display panel based on the result of determining whether the screen displays the specific screen.

When the screen displays an always on display (AOD) image, the host may be configured to determine the noise level of the display panel as a first level, and when the screen displays a repeated white and black areas (e.g., a zebra image), the host may be configured to determine the noise level of the display panel as a second level that is higher than the first level.

When the screen displays a still image, the host may be configured to determine the noise level of the display panel as a first level, and when the screen displays a moving image, the host may be configured to determine the noise level of the display panel as a second level that is higher than the first level.

The host may be configured to determine whether an application program executed on the mobile electronic device is a designated program, and may be configured to determine the noise level of the display panel as the second level when the executed application program is the designated program.

The touch driving circuit may be configured to group the plurality of touch driving electrodes into units of a plurality of driving electrodes and supply the driving signal in units of each group, receive a first noise signal using some noise sensing electrodes adjacent to touch driving electrodes of the remaining group to which the driving signal is not supplied, while supplying the driving signal to a specific group, determine the noise level of the display panel using the received first noise signal, select at least some noise sensing channels among a plurality of noise sensing channels based on the determined noise level, receive a second noise signal using at least some of the selected noise sensing channels, and compensate for the touch sensing signal using the received second noise signal.

The touch driving circuit may be configured to receive a first noise signal using the plurality of noise sensing electrodes during a vertical blank period of the display panel, determine the noise level of the display panel using the received first noise signal, select at least some noise sensing channels among a plurality of noise sensing channels based on the determined noise level, receive a second noise signal using at least some of the selected noise sensing channels, and compensate for the touch sensing signal using the received second noise signal.

A mobile electronic device includes an application processor, a display panel, a sensor unit overlapping the display panel and including a plurality of touch driving electrodes, a plurality of touch sensing electrodes, and a plurality of noise sensing electrodes, and a touch driving circuit supplying a driving signal to the plurality of touch driving electrodes and receiving a touch sensing signal from the plurality of touch sensing electrodes. The touch driving circuit is configured to receive a noise level signal indicating a noise level of the display panel from the application processor, select at least some noise sensing channels among a plurality of noise sensing channels connected to the plurality of noise sensing electrodes, based on the noise level signal, receive a noise signal using at least some of the selected noise sensing channels, and compensate for the touch sensing signal using the received noise signal.

The application processor may be configured to determine whether the mobile electronic device to which the mobile electronic device is applied is in a designated state, and may be configured to determine the noise level based on the determined designated state of the mobile electronic device, and the designated state may include a state in which an electrical charger (e.g., a travel adapter) is connected to the mobile electronic device.

The noise level signal may include a vertical synchronization signal with variable amplitude.

The vertical synchronization signal may have a first amplitude when the noise level is a first level, and may have a second amplitude when the noise level is a second level that is higher than the first level.

The application processor may be configured to determine whether a screen according to the image data is a specific screen, and may be configured to determine the noise level of the display panel based on the result of determining whether the screen displays the specific screen.

When the screen displays an always on display (AOD) image, the application processor may be configured to determine the noise level of the display panel as a first level, and when the screen displays repeated white and black areas (e.g., a zebra image), the application processor may be configured to determine the noise level of the display panel as a second level that is higher than the first level.

When the screen displays a still image, the application processor may be configured to determine the noise level of the display panel as a first level, and when the screen displays a moving image, the application processor may be configured to determine the noise level of the display panel as a second level that is higher than the first level.

The application processor may be configured to determine whether an application program executed on the mobile electronic device is a designated program, and may be configured to determine the noise level of the display panel as the second level when the executed application program is the designated program.

The touch driving circuit may be configured to group the plurality of touch driving electrodes into units of a plurality of driving electrodes and supply the driving signal in units of each group, receive a first noise signal using some noise sensing electrodes adjacent to touch driving electrodes of the remaining group to which the driving signal is not supplied, while supplying the driving signal to a specific group, determine the noise level of the display panel using the received first noise signal, select at least some noise sensing channels among a plurality of noise sensing channels based on the determined noise level, receive a second noise signal using at least some of the selected noise sensing channels, and compensate for the touch sensing signal using the received second noise signal.

The touch driving circuit may be configured to receive a first noise signal using the plurality of noise sensing electrodes during a vertical blank period of the display panel, determine the noise level of the display panel using the received first noise signal, select at least some noise sensing channels among a plurality of noise sensing channels based on the determined noise level, receive a second noise signal using at least some of the selected noise sensing channels, and compensate for the touch sensing signal using the received second noise signal.

BRIEF DESCRIPTION OF THE DRAWINGS

The above and other aspects and features of the present disclosure will become more apparent by describing in detail embodiments thereof with reference to the attached drawings, in which.

DETAILED DESCRIPTION OF THE EMBODIMENTS

The present invention will now be described more fully hereinafter with reference to the accompanying drawings, in which embodiments of the invention are shown. This invention may, however, be embodied in different forms and should not necessarily be construed as limited to the embodiments set forth herein. Rather, these embodiments are provided so that this disclosure will be thorough and complete, and will fully convey the scope of the invention to those skilled in the art.

It will also be understood that when a layer is referred to as being "on" another layer or substrate, it can be directly on the other layer or substrate, or intervening layers may also be present. The same reference numbers may indicate the same components throughout the specification and the figures.

It will be understood that, although the terms "first," "second," etc. may be used herein to describe various elements, these elements should not necessarily be limited by these terms. These terms are used to distinguish one element from another element. For instance, a first element discussed below could be termed a second element without departing from the teachings of the present invention. Similarly, the second element could also be termed the first element.

Features of each of various embodiments of the present disclosure may be partially or entirely combined with each other and may technically variously interwork with each other, and respective embodiments may be implemented independently of each other or may be implemented together in association with each other.

Hereinafter, specific embodiments will be described with reference to the accompanying drawings.

Figure 1:
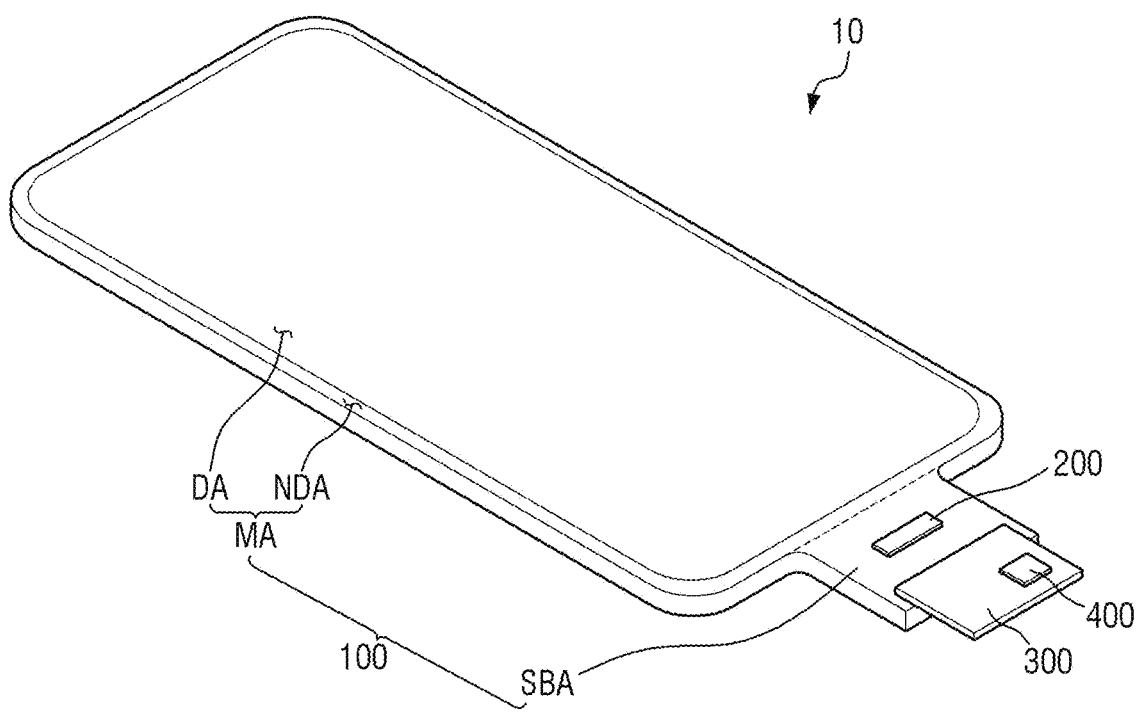
FIG. 1 is a schematic perspective view of a display device according to an embodiment.
Figure 2:
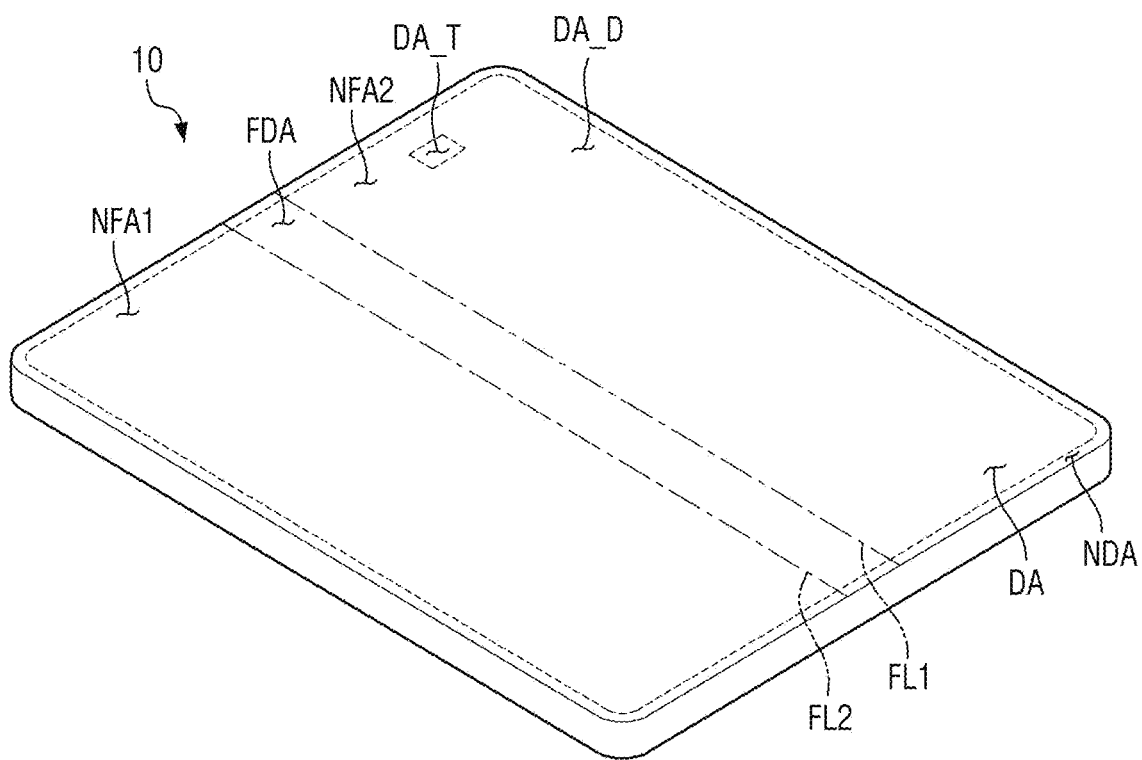
FIG. 2 is a perspective view illustrating a foldable display device according to an embodiment.

FIG. 1 is a schematic perspective view of a display device according to an embodiment. FIG. 2 is a perspective view illustrating a foldable display device according to an embodiment.

Referring to FIGS. 1 and 2, a display device 10 may be applied to various electronic devices that provide a display screen. For example, the display device 10 may be applied to portable electronic devices such as mobile phones, smartphones, tablet computers, mobile communication terminals, electronic notebooks, electronic books, portable multimedia players (PMPs), navigation systems, and ultra mobile PCs (UMPCs). For example, the display device 10 may be applied to a display unit of a television, a laptop computer, a computer monitor, a digital billboard, or an Internet of Things (IoT) device. In addition, the display device 10 may be applied to wearable devices such as smart watches, watch phones, glasses-type displays, and head mounted displays (HMDs).

Referring to FIG. 1, the display device 10 may be formed in a planar shape similar to a quadrilateral. For example, the display device 10 may have a planar shape similar to a quadrilateral having a short side in a first direction X and a long side in a second direction Y. A corner where the short side in the first direction X and the long side in the second direction Y meet may be rounded to have a predetermined curvature or may have a right angled shape. The planar shape of the display device 10 is not necessarily limited to the quadrilateral, and may have a shape similar to other polygons, circles, or ovals.

The display device 10 may be a double-sided display device 10 in which display is performed on both the front and rear surfaces, but hereinafter, an embodiment in which the display surface is positioned on the front surface of the display device 10 will be mainly described.

The display device 10 includes a display panel 100 that provides a display screen, a display driving circuit 200, a circuit board 300, and a touch driving circuit 400. The touch driving circuit 400 is a component configured to sense a user's touch input and may be referred to as a "touch sensing device."

The display panel 100 may be formed in a planar shape similar to a quadrilateral. The planar shape of the display panel 100 is not necessarily limited to the quadrilateral, and may have a shape similar to other polygons, circles, or ovals. In addition, the display panel 100 may also be flexibly formed to be flexibly bent or curved.

The display panel 100 may include a main area MA and a sub-area SBA.

The main area MA may include a display area DA including pixels displaying an image, and a non-display area NDA at least partially surrounding the display area DA. The display area DA may emit light from a plurality of light emitting areas or a plurality of opening areas. For example, the display panel 100 may include a pixel circuit including switching elements, a pixel defining film defining the light emitting areas or the opening areas, and a self-light emitting element.

The non-display area NDA may be an area outside the display area DA. The non-display area NDA may be defined as an edge area of the main area MA of the display panel 100. The non-display area NDA may include a gate driver that supplies gate signals to gate lines of the display panel 100.

The sub-area SBA may extend from one side of the main area MA. The sub-area SBA may be bent to overlap the main area MA in a third direction Z. The sub-area SBA may include a pad portion connected to the display driving circuit 200 and the circuit board 300.

Referring to FIG. 2, the display device according to an embodiment may be a foldable display device.

The display device 10 may maintain both a first state in which the display device 10 is unfolded and a second state in which the display device 10 is folded. The display device 10 may be folded in an in-folding manner so that the display areas DA face each other. In this case, upper surfaces of the display device 10 may face each other when folded, but the present disclosure is not necessarily limited thereto. For example, the display device 10 may be folded in an out-folding manner so that lower surfaces thereof face each other.

The display device 10 may include a folding area FDA, a first non-folding area NFA1, and a second non-folding area NFA2. The folding area FDA may be an area in which the display device 10 is bent or folded, and the first non-folding area NFA1 and the second non-folding area NFA2 may be areas in which the display device 10 is not bent or folded. For example, the first non-folding area NFA1 and the second non-folding area NFA2 may be flat areas of the display device 10.

The first non-folding area NFA1 may be disposed on one side of the folding area FDA, for example, a left side thereof. The second non-folding area NFA2 may be disposed on the other side of the folding area FDA, for example, a right side thereof. The folding area FDA is an area defined by the first folding line FL1 and the second folding line FL2 and may be an area in which the display device 10 is bent with a predetermined curvature. The first folding line FL1 may be a boundary between the folding area FDA and the first non-folding area NFA1, and the second folding line FL2 may be a boundary between the folding area FDA and the second non-folding area NFA2.

Each of the display area DA and the non-display area NDA may overlap at least one of the folding area FDA, the first non-folding area NFA1, and the second non-folding area NFA2. It is illustrated in the illustrated example that each of the display area DA and the non-display area NDA overlaps the folding area FDA, the first non-folding area NFA1, and the second non-folding area NFA2.

The display area DA may include a first display area DA and a second display area DA having different light transmittances. The display area DA may be divided into the first display area DA and the second display area DA depending on whether it includes a light transmitting portion TA. For example, the display area DA may include a display dedicated area DA_D, which is the first display area DA, and a display light transmitting area DA_T, which is the second display area DA. The display dedicated area DA_D does not include the light transmitting portion TA, and the display light transmitting area DA_T may include the light transmitting portion TA. The display area DA may include one display light transmitting area DA_T, but is not necessarily limited thereto, and may also include a plurality of display light transmitting areas DA_T separated from each other.

The display dedicated area DA_D may be disposed around the display light transmitting area DA_T. The display dedicated area DA_D may partially or completely surround the display light transmitting area DA_T. The display dedicated area DA_D and the display light transmitting area DA_T are adjacent to each other and may be continuously disposed without separate physical division. In an embodiment, the display dedicated area DA_D and the display light transmitting area DA_T might not be distinguishable with a naked eye, but the present disclosure is not necessarily limited thereto.

There is no limit to an arrangement area of the display light transmitting area DA_T within the display area DA. For example, the display area DA_T may be spaced apart from the non-display area NDA and surrounded by the display area DA. As another example, the display light transmitting area DA_T may be disposed around an edge of the display area DA and may also be in contact with the non-display area NDA.

Since the display light transmitting area DA_T further includes the light transmitting portion compared to the display dedicated area DA_D, the display light transmitting area DA_T and the display dedicated area DA_D may have different densities of pixels PX related to resolution. For example, the resolution of the display light transmitting area DA_T may be lower than the resolution of the display dedicated area DA_D, but is not necessarily limited thereto.

Figure 3:
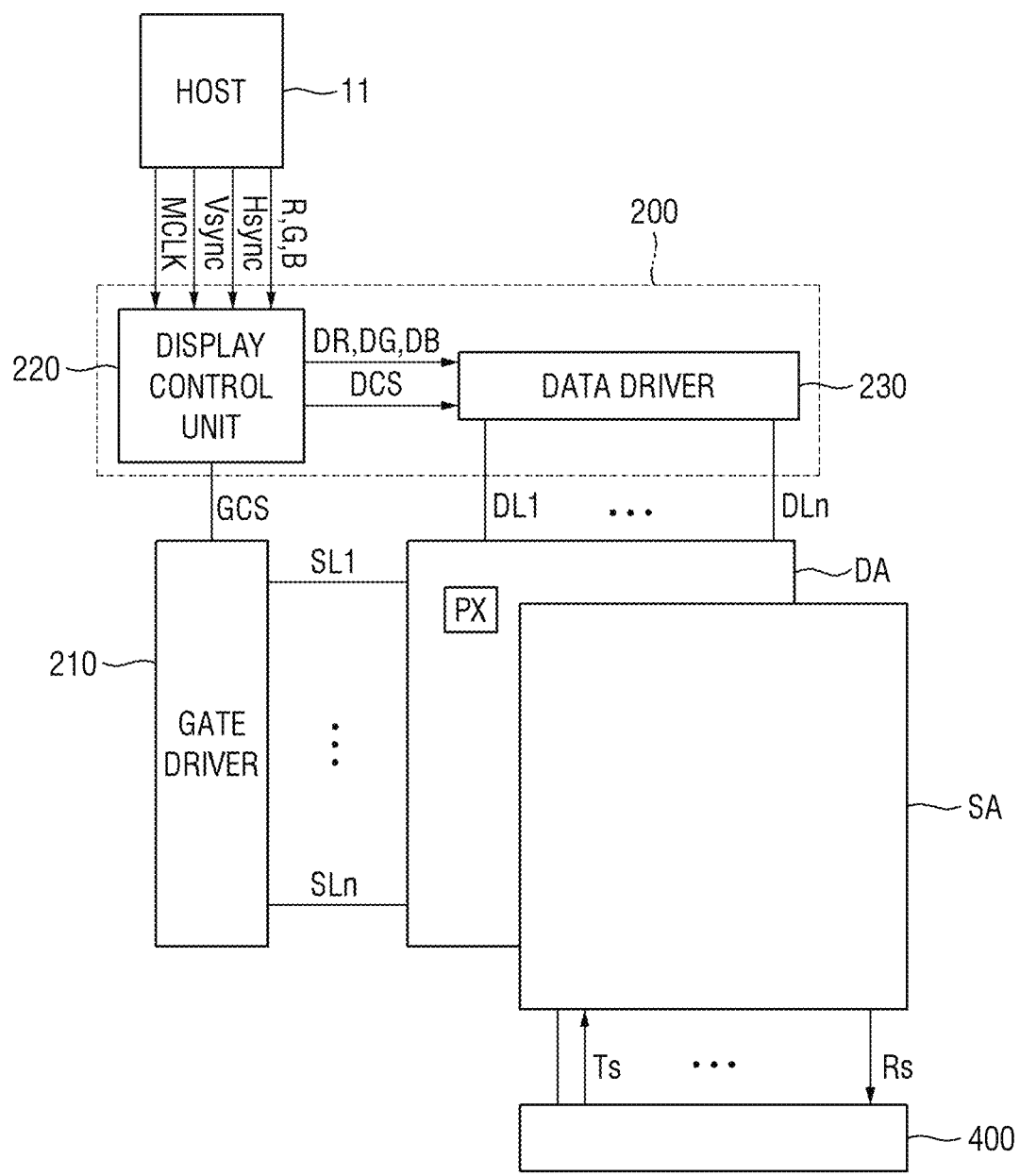
FIG. 3 is a conceptual view of a display unit and a touch driver according to an embodiment.

FIG. 3 is a conceptual view of a display unit and a touch driver according to an embodiment.

Referring to FIG. 3, the display device 10 includes a display panel 100 including a plurality of pixels PX, a display driving circuit 200, and a touch driving circuit 400. The display driving circuit 200 and the touch driving circuit 400 may operate based on a control signal or command signal from a host 11. For example, the host 11 may be an application processor (or another form of processor circuit). According to an embodiment, the touch driving circuit 400 may be controlled by the display driving circuit 200.

The display driving circuit 200 may include a data driver 230 and a display control unit 220.

The display control unit 220 may receive input data (R, G, B) and a timing control signal from the outside (e.g., the host 11). The timing control signal may include a vertical synchronization signal Vsync indicating one frame period, a horizontal synchronization signal Hsync indicating one horizontal period, and a main clock MCLK that repeats at a predetermined period. The input data (R, G, B) may be RGB data including red image data, green image data, and blue image data. The display control unit 220 may generate output data signals DR, DG, and DB and an internal control signal using the received input data (R, G, B) and timing control signal. The internal control signal includes a data control signal DCS and a gate control signal GCS.

The vertical synchronization signal Vsync may serve as a noise level signal indicating a noise level of the display panel 100, as will be described later with reference to FIG. 9. For example, the host 11 predetermines the noise level of the display panel 100, varies the vertical synchronization signal Vsync according to the determined noise level of the display panel 100, and supplies the varied vertical synchronization signal Vsync to the display control unit 220 or the touch driving circuit 400.

As used herein, a high noise level of the display panel 100 means that a noise influence from the display panel 100 to a touch sensor TSM is relatively large. As used herein, a low noise level of the display panel 100 means that a noise influence from the display panel 100 to the touch sensor TSM is relatively small.

The host 11 may analyze image data to be displayed on the display panel 100 and predetermine the noise level of the display panel 100. The host 11 may be configured to determine whether a screen according to the image data is a specific screen and determine the noise level according to the determined result. The specific screen may include, for example, an image with repeated white and black areas (e.g., a zebra image) or an always on display (AOD) image, but the type of the specific screen is not necessarily limited thereto.

The host 11 may be configured to determine a state of a mobile electronic device to which the display device 10 is applied, for example, whether an electrical charger (e.g., travel adapter) is connected to the mobile electronic device, and determine the noise level according to the determined result.

The host 11 may supply a separate noise level signal indicating the noise level to the display control unit 220 or the touch driving circuit 400 without using the horizontal synchronization signal Hsync. However, in the following, it will be mainly described that the horizontal synchronization signal Hsync serves as a noise level signal.

The display control unit 220 may control an operation of the data driver 230 by providing a data control signal DCS to the data driver 230. The display control unit 220 may control an operation of the gate driver 210 by providing a gate control signal GCS to the gate driver 210.

The data driver 230 may receive the output data signals DR, DG, and DB and the data control signal DCS from the display control unit 220. The data driver 230 may generate a data signal using the received output data signals DR, DG, and DB and data control signal DCS. The data driver 230 may provide the generated data signal to the display panel 100. The data driver 230 may provide the data signal to the plurality of pixels PX through a plurality of data lines DL formed in the display panel 100.

The gate driver 210 may receive the gate control signal GCS from the display control unit 220. The gate driver 210 may generate a gate signal using the received gate control signal GCS. The gate driver 210 may provide the generated gate signal to the display panel 100. The gate driver 210 may provide the gate signal to the plurality of pixels PX through a plurality of gate lines SL formed in the display panel 100.

It is illustrated in FIG. 3 that the display driving circuit 200 does not include the gate driver 210, but the present disclosure is not necessarily limited thereto. For example, the gate driver 210 may be included in the display driving circuit 200 that controls the operation of the display panel 100. The gate driver 210, the data driver 230, and the display control unit 220 may be formed as an integrated circuit (IC). The gate driver 210 may be formed during a TFT process of the display panel 100. The display control unit 220 and the data driver 230 may be merged to form a timing controller embedded driver integrated circuit (TED).

The display panel 100 may include a plurality of pixels PX connected to the plurality of data lines DL and the plurality of gate lines SL.

A frame frequency at which the display driving circuit 200 drives the display panel 100 may be variable. For example, the frame frequency may vary within the range of 1 Hz to 240 Hz depending on the selection of the host 11 or the user. The display driving circuit 200 may drive at 60 Hz for one period and change the frame frequency to 120 Hz for another period depending on the user's needs.

The touch sensing area SA may include a plurality of first electrodes (120 in FIG. 5), a plurality of second electrodes (130 in FIG. 5), and a plurality of touch driving lines and touch sensing lines. The touch sensing area SA may sense a touch input by being applied with an electrical signal from the touch driving circuit 400 disposed on the circuit board 300 through the plurality of touch driving lines, or transmitting the electrical signal sensed from the plurality of first electrodes 120 to the touch driving circuit 400 through the plurality of touch sensing lines. For example, the touch driving circuit 400 may sense the touch input by converting an analog electrical signal sensed in the touch sensing area SA into a digital signal.

Figure 4:
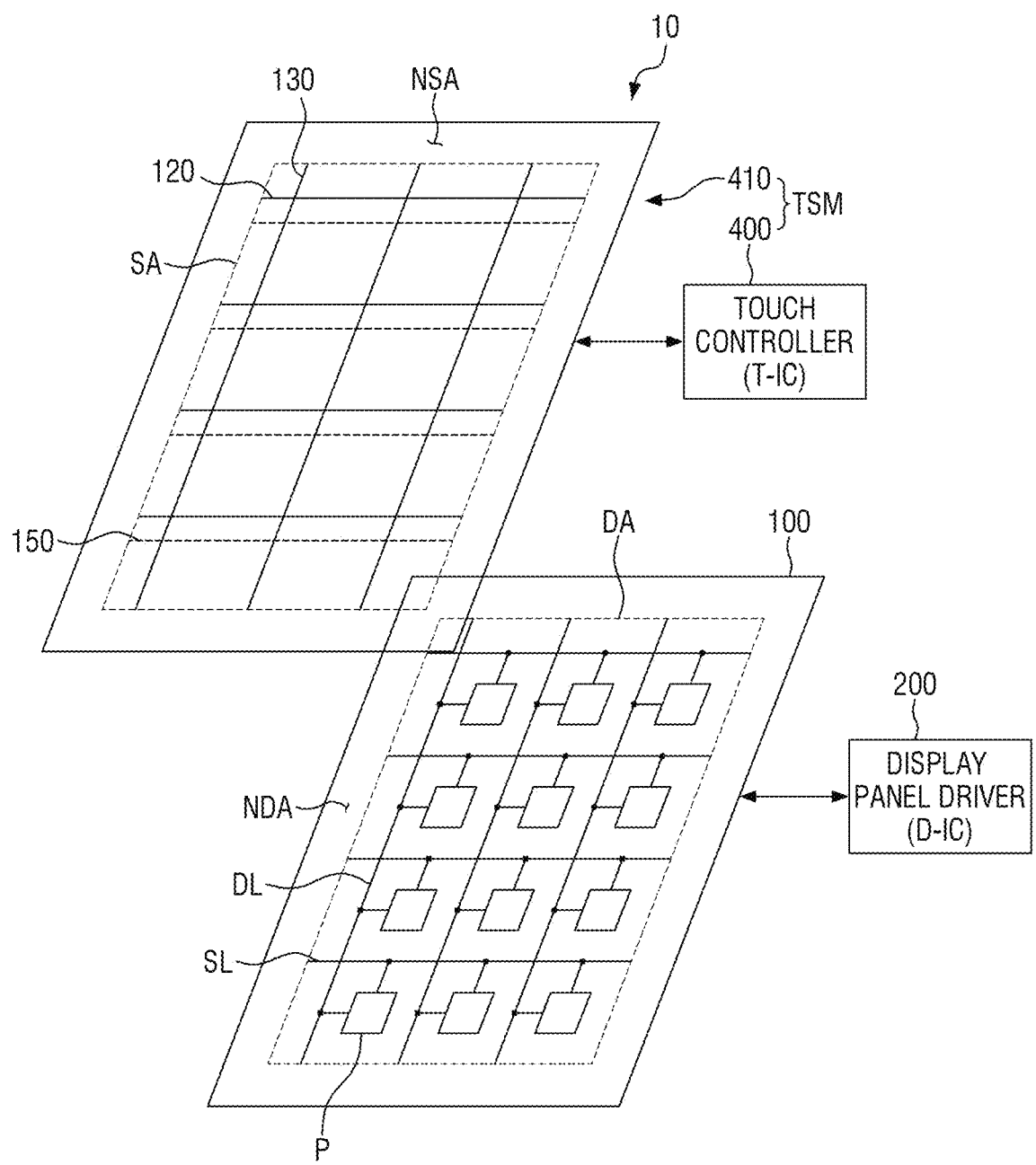
FIG. 4 schematically illustrates a touch sensor and a display device including the same according to an embodiment.
Figure 5:
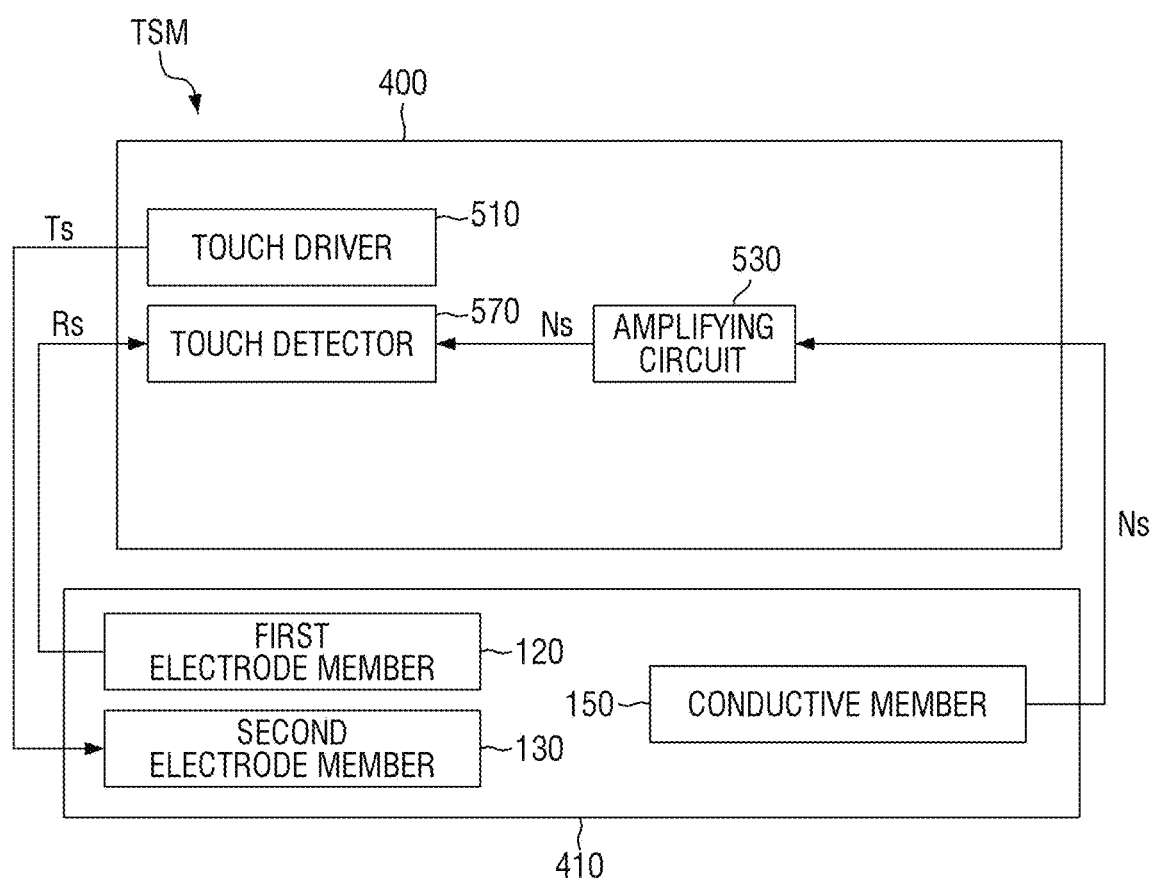
FIG. 5 is a block diagram of the touch sensor according to an embodiment illustrated in FIG. 4.

FIG. 4 schematically illustrates a touch sensor TSM and a display device including the same according to an embodiment. FIG. 5 is a block diagram of the touch sensor TSM according to an embodiment illustrated in FIG. 4.

Referring to FIGS. 4 and 5, the display device 10, according to an embodiment, may include a touch sensor TSM and a display panel 100, and may further include a display driving circuit 200. The touch sensor TSM includes a sensor unit 410 and a touch driving circuit 400.

It is illustrated in the illustrated embodiment that the sensor unit 410 and the display panel 100 are separated from each other, but this is for convenience of explanation, and the present disclosure is not necessarily limited thereto. For example, the sensor unit 410 and the display panel 100 may also be integrally formed.

The display panel 100 may include a display area DA and a non-display area NDA at least partially surrounding at least one area of the display area DA. The display area DA is provided with a plurality of gate lines SL and data lines DL, and a plurality of pixels P (e.g., PX in FIG. 3) connected to the gate lines SL and data lines DL. The non-display area NDA may be provided with lines for supplying various driving signals and/or driving power for driving the pixels P.

In the present disclosure, the type of display panel 100 is not necessarily particularly limited thereto. For example, the display panel 100 may be a self-light emitting display panel such as an organic light emitting diode (OLED) display panel, a quantum dot light emitting display (QLED) panel, a micro light emitting diode (LED) display panel, and a nano light emitting diode (LED) display panel. Alternatively, the display panel 100 may be a non-light emitting display panel such as a liquid crystal display (LCD) panel, an electrophoretic display (EPD) panel, and an electro-wetting display (EWD) panel. When the display panel 100 is a non-light emitting display panel, the display device may further include a back-light unit for supplying light to the display panel 100. Hereinafter, for convenience of description, a case in which the display panel 100 is an organic light emitting diode (OLED) display panel will be described as an example.

The sensor unit 410 may be provided on at least one area of the display panel 100. For example, the sensor unit 410 may be provided on at least one surface of the display panel 100 to overlap the display panel 100. For example, the sensor unit 410 may be disposed on one (e.g., an upper surface) of both surfaces of the display panel 100 in a direction in which the image is emitted. Alternatively, the sensor unit 410 may be formed directly on at least one of both surfaces of the display panel 100, or may be formed inside the display panel 100. For example, the sensor unit 410 may be formed directly on an outer surface (e.g., an upper surface of an upper substrate or a lower surface of a lower substrate) of the upper substrate (or thin film encapsulation layer) or the lower substrate of the display panel 100, or may also be formed directly on an inner surface (e.g., a lower surface of the upper substrate or an upper surface of the lower substrate) of the upper or lower substrate.

The sensor unit 410 includes a sensing area SA and a peripheral area NSA. In some embodiments, the peripheral area NSA may at least partially surround at least a portion of the sensing area SA. In some embodiments, the sensing area SA may be an area of the sensor unit 410 that senses a touch input, and the peripheral area NSA may be an area of the sensor unit 410 that does not sense a touch input. According to the embodiment, the sensing area SA may be disposed to correspond to the display area DA of the display panel 100, and the peripheral area NSA may be disposed to correspond to the non-display area NDA of the display panel 100. For example, the sensing area SA of the sensor unit 410 may overlap the display area DA of the display panel 100, and the peripheral area NSA of the sensor unit 410 may overlap the non-display area NDA of the display panel 100.

A plurality of first touch electrode members 120 and a plurality of second touch electrode members 130 for detecting a touch input may be provided in the sensing area SA of the sensor unit 410. The first touch electrode member 120 may be called "touch sensing electrode 120" or "first electrode." The second touch electrode member 130 may be called "touch driving electrode 130" or "second electrode." Hereinafter, in some descriptions, the description will be made by replacing the first touch electrode member 120 with the touch sensing electrode 120. Hereinafter, in some descriptions, the description will be made by replacing the second touch electrode member 130 with the touch driving electrode 130.

The first touch electrode members 120 may extend along a first direction (e.g., x-direction) and may be spaced apart from each other along a second direction (e.g., y-direction) that intersects the first direction x. For example, the first touch electrode members 120 extending in the first direction x may be spaced apart from each other along the second direction y to form an electrode row.

The second touch electrode members 130 may extend along the second direction y and be spaced apart from each other along the first direction x. The second touch electrode member 130 may be spaced apart from the first touch electrode member 120 and may be insulated from the first touch electrode member 120. For example, the second touch electrode members 130 extending in the second direction y may be spaced apart from each other along the first direction x to form a column.

The shape, size, and/or arrangement direction of the first touch electrode member 120 and the second touch electrode member 130 are not necessarily particularly limited thereto.

The first touch electrode member 120 and the second touch electrode member 130 may be electrically connected to the touch driving circuit 400. In some embodiments, the second touch electrode member 130 may be a driving electrode member that receives a driving signal Ts for touch detection from the touch driving circuit 400, and the first touch electrode member 120 may be a sensing electrode member that outputs a sensing signal Rs for touch detection to the touch driving circuit 400.

The first touch electrode member 120 and the second touch electrode member 130 may overlap at least one electrode provided in the display panel 100. For example, when the display panel 100 is an organic light emitting diode (OLED) display panel, the first touch electrode member 120 and the second touch electrode member 130 may overlap a cathode electrode of the display panel 100, etc.

A conductive member 150 may be provided in the sensing area SA of the sensor unit 410. The conductive member 150 may sense noise generated in the sensor unit 410 and provide the sensed noise as a noise signal Ns to a touch detector 570. The conductive member 150 may be spaced apart from the first touch electrode member 120 and the second touch electrode member 130 and may be insulated from the first touch electrode member 120 and the second touch electrode member 130. The conductive member 150 may be called "noise sensing electrode 150" or "third electrode." Hereinafter, in some descriptions, the description will be made by replacing the conductive member 150 with the noise sensing electrode 150.

In some embodiments, the conductive members 150 may extend along the first direction x in the same manner as the first touch electrode members 120 and may be spaced apart from each other along the second direction y that intersects the first direction x.

The touch driving circuit 400 may detect a touch position by being electrically connected to the sensor unit 410 to supply the driving signal Ts to the sensor unit 410 and receive the sensing signal Rs corresponding to the driving signal Ts from the sensor unit 410.

In some embodiments, the touch driving circuit 400 may include a touch driver 510 and a touch detector 570. In addition, the touch driving circuit 400 may further include an amplifying circuit 530.

The touch driver 510 may provide a driving signal Ts for detecting a touch input to the second touch electrode member 130.

The touch detector 570 may detect the presence or absence of the touch input and/or a position of the touch input by receiving the sensing signal Rs corresponding to the driving signal Ts from the first touch electrode member 120 during a period of performing the touch sensing operation. In some embodiments, the sensing signal Rs may be an amount of change in mutual capacitance occurring between the first touch electrode member 120 and the second touch electrode member 130. For example, when the touch input occurs, mutual capacitance changes at a point where the touch input is provided or a peripheral portion of the point. The touch detector 570 may receive the amount of change in mutual capacitance between the first touch electrode member 120 and the second touch electrode member 130 as the sensing signal Rs, and may be configured to determine the presence or absence of the touch input and the position of the touch input using the sensing signal Rs. In addition, the touch detector 570 may receive the noise signal Ns from the conductive member 150 and remove or cancel out noise included in the sensing signal Rs using the noise signal Ns. Removing or canceling out the noise included in the sensing signal Rs using the noise signal Ns may mean compensating for the sensing signal Rs using the noise signal Ns.

In some embodiments, the touch detector 570 may include one or more amplifiers that amplify the received sensing signal Rs, an analog digital converter connected to an output terminal of the amplifier, and a processor.

The amplifying circuit 530 may be connected to the conductive member 150 and the touch detector 570, and may amplify the noise signal Ns provided from the conductive member 150 or adjust a gain value and provide the amplified noise signal Ns or adjusted gain value to the touch detector 570.

In some embodiments, the touch driver 510, the touch detector 570, and the amplifying circuit 530 may be integrated inside one touch IC. However, the present disclosure is not necessarily limited thereto. In some other embodiments, portions of the touch driver 510, touch detector 570, and amplifying circuit 530 may be positioned inside the touch IC, and other portions of the touch driver 510, touch detection unit 570, and amplification circuit 530 may also be positioned elsewhere than inside the touch IC.

Figure 6:
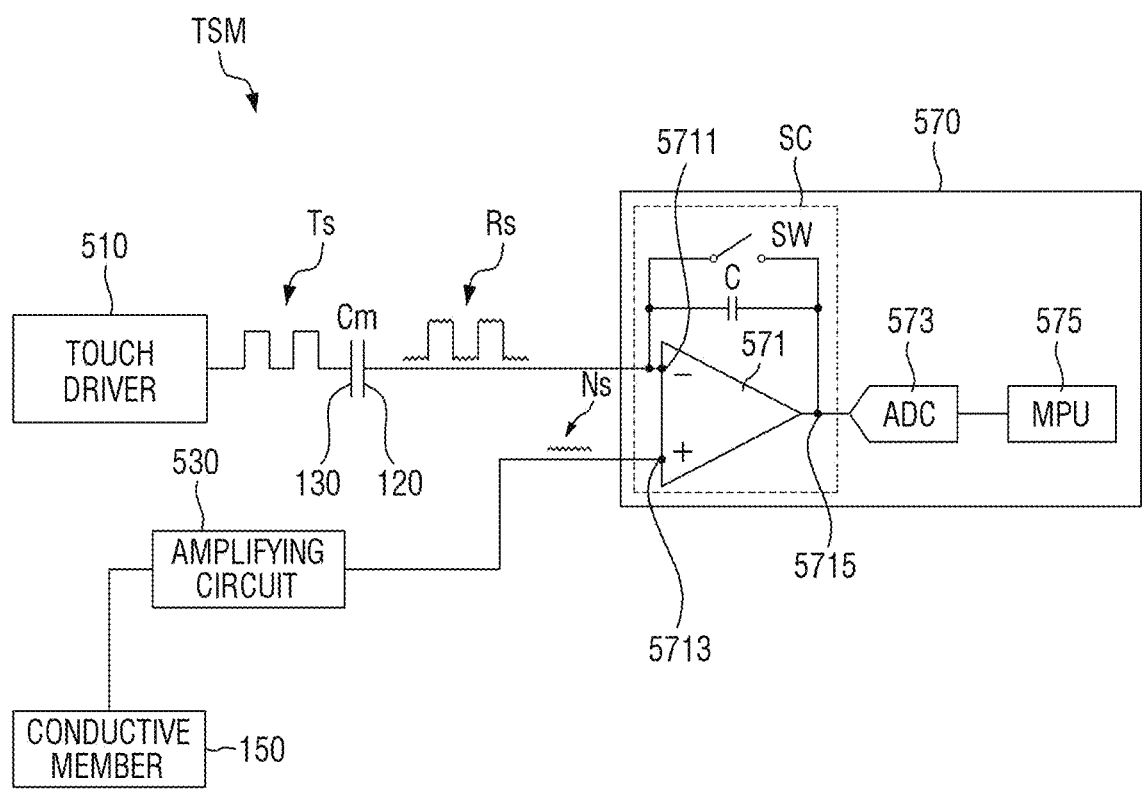
FIG. 6 is a view for schematically describing a touch position detection operation of the touch sensor according to an embodiment.
Figure 7:
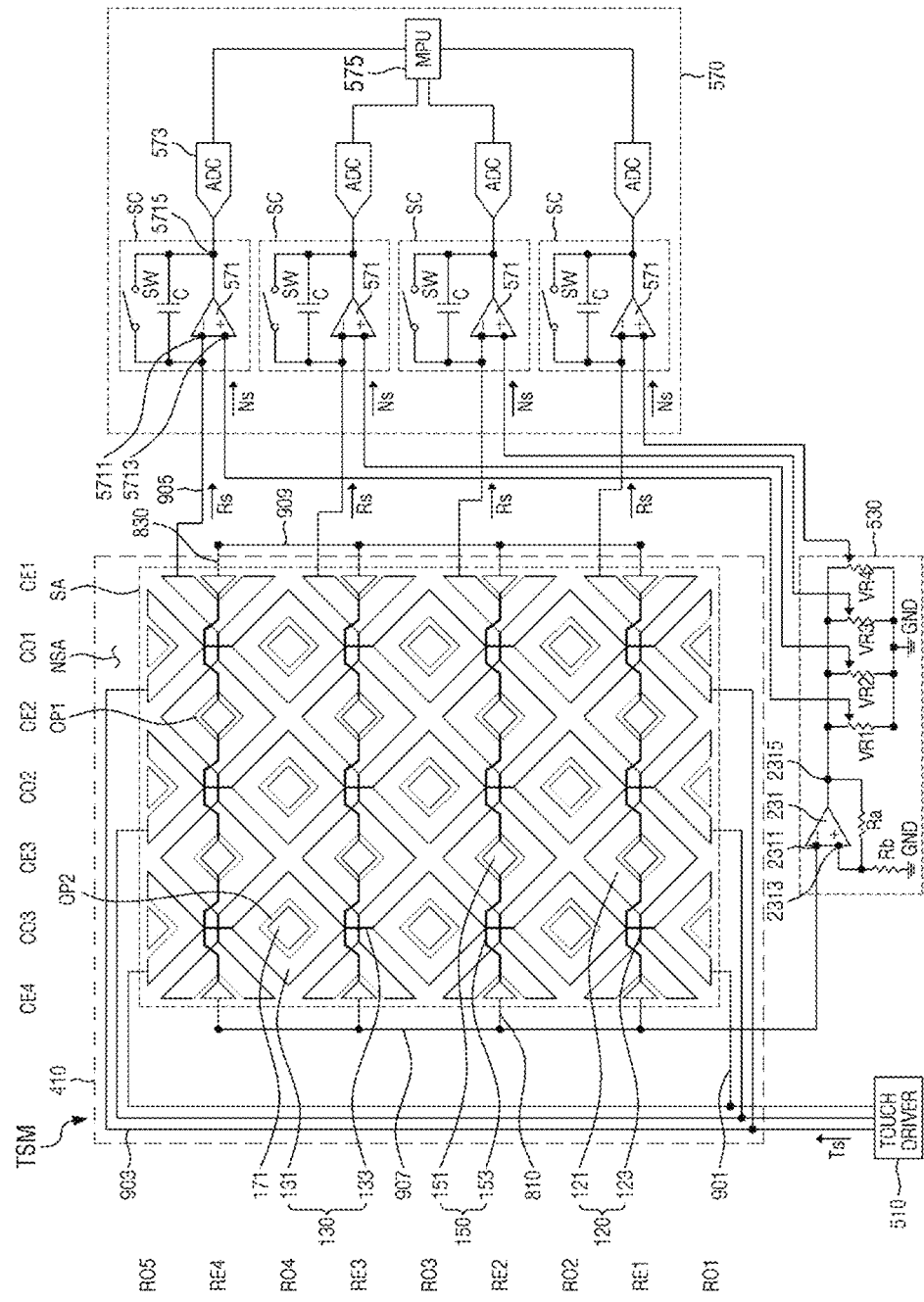
FIG. 7 is a view illustrating a connection relationship between a sensor unit and a control unit according to an embodiment.

FIG. 6 is a view for schematically describing a touch position detection operation of the touch sensor TSM according to an embodiment. FIG. 7 is a view illustrating a connection relationship between a sensor unit and a control unit according to an embodiment.

Referring to FIGS. 6 and 7, the touch driver 510 may provide the driving signal Ts to the second touch electrode member 130 through a first touch signal line 901 and a second touch signal line 903. In some embodiments, the driving signal Ts may be sequentially provided to each of the second touch electrode members 130.

The touch detector 570 may receive the sensing signal Rs from the first touch electrode member 120 through a third touch signal line 905.

In some embodiments, the sensing signal Rs may include information on the amount of change in mutual capacitance occurring between the first touch electrode member 120 and the second touch electrode member 130 as described above. When the driving signal Ts is provided to the second touch electrode member 130, a mutual capacitance Cm is formed between the second touch electrode member 130 and the first touch electrode member 120. In addition, when a touch event such as a touch input occurs, a change in mutual capacitance Cm may occur. The first touch electrode member 120 may output the sensing signal Rs corresponding to the driving signal Ts, and the sensing signal Rs output by the first touch electrode member 120 may be input to the touch detector 570. In some embodiments, the sensing signal Rs may include the information on the amount of change in mutual capacitance described above.

In some embodiments, the touch detector 570 may include a plurality of sensing channels SC electrically connected to each first touch electrode member 120. In addition, the touch detector 570 may include at least one analog digital converter (ADC) 573 connected to the sensing channel SC and a processor 575. Hereinafter, the sensing channel SC and the analog digital converter 573 will be described as separate components, but in another embodiment, the analog digital converter 573 may also be configured within each sensing channel SC.

The sensing channel SC may receive the sensing signal Rs from each first touch electrode member 120, and amplify and output the received sensing signal Rs. In some embodiments, the sensing channel SC may include an analog front end including at least one amplifier 571, such as an operational (OP) amplifier.

The amplifier 571 may include a first input terminal 5711, a second input terminal 5713, and an output terminal 5715. Depending on the embodiment, the first input terminal 5711 of the amplifier 571, for example, an inverting input terminal of the OP amplifier, may be electrically connected to the first touch electrode member 120 through a third touch signal line 905, etc., and the sensing signal Rs may be input to the first input terminal 5711.

In some embodiments, the second input terminal 5713 of the amplifier 571, for example, a non-inverting input terminal of the OP amplifier, may be electrically connected to the conductive member 150 or the amplifying circuit 530 through a noise signal line 907, etc., and the noise signal Ns output from the conductive member 150 may be provided to the second input terminal 5713 of the amplifier 571. Accordingly, a reference voltage of each amplifier 571 changes together depending on a voltage change of each conductive member 150. For example, a reference potential of each amplifier 571 may change depending on a potential (e.g., voltage level) of the conductive member 150.

The potential of the conductive member 150 may change depending on the noise signal Ns flowing into the sensor unit 410 from the display panel 100, etc. For example, the potential of the conductive member 150 may change in response to noise flowing into the sensor unit 410 from the display panel 100, etc.

When the conductive member 150 is further disposed in the sensing area SA and the reference potential of the amplifier 571 is changed using the noise signal Ns output from the conductive member 150, the noise flowing into the sensor unit 410 may be canceled out (or removed).

For example, the first touch electrode member 120, which is the sensing electrode member, and the conductive member 150 have ripples corresponding to each other in response to noise. In particular, as the first touch electrode member 120 and the conductive member 150 extend in the same direction and are arranged at positions corresponding to each other, the first touch electrode member 120 and the conductive member 150 receive noise signals of the same or very similar shape and/or magnitude. In addition, the first touch electrode member 120 is electrically connected to the first input terminal 5711 of the amplifier 571 through the third touch signal line 905, and the conductive member 150 is electrically connected to the second input terminal 5713 of the amplifier 571 through the noise signal line 907 that is different from the third touch signal line 905. For example, the noise signal Ns is provided to the amplifier 571 through a different path from the sensing signal Rs. Therefore, a noise component (e.g., ripple) included in the sensing signal Rs received from the first touch electrode member 120 may be effectively canceled out. Accordingly, the signal output from the output terminal 5715 of the amplifier 571 may be a sensing signal from which the noise is removed.

In some embodiments, the sensing channel SC may further include a capacitor C and a reset switch SW connected in parallel between the first input terminal 5711 and the output terminal 5715 of the amplifier 571.

It is described in the above-described example that the amplifier 571 is implemented in the form of an inverting amplifier, but the present disclosure is not necessarily limited thereto. In another embodiment, the amplifier 571 may also be implemented in the form of a non-inverting amplifier.

The output terminal 5715 of the amplifier 571 may be electrically connected to the analog digital converter 573.

The analog digital converter 573 may convert the input analog signal into a digital signal. Depending on the embodiment, the analog digital converter 573 may be provided as many as the number of first touch electrode members 120 to correspond to each first touch electrode member 120 in a one-to-one manner. Alternatively, in another embodiment, each first touch electrode member 120 may be configured to share one analog digital converter 573, and in this case, a separate switch circuit for selecting the sensing channel may be further provided.

The processor 575 performs signal processing on the converted signal (e.g., digital signal) from the analog digital converter 573 and detects the touch input according to the signal processing result. As an example, the processor 575 may detect whether the touch input occurs and a position of the touch input by comprehensively analyzing the first sensing signal amplified by the amplifier 571 and converted by the analog digital converter 573. Depending on the embodiment, the processor 575 may be implemented as a microprocessor (MPU). In this case, a memory necessary for driving the processor 575 may be additionally provided inside the touch detector 570. The configuration of the processor 575 is not necessarily limited thereto. As another example, the processor 575 may also be implemented as a microcontroller (MCU).

The touch driving circuit 400 may further include an amplifying circuit 530 connected between the second input terminal 5713 of the sensing channel SC and the conductive member 150. Depending on the embodiment, the amplifying circuit 530 may include at least one amplifier 231. Depending on the embodiment, the amplifier 231 may include a first input terminal 2311 commonly connected to the conductive member 150 through the noise signal line 907, and a second input terminal 2313 connected to an output terminal 2315 through at least one resistance Ra. Depending on the embodiment, the first input terminal 2311 and the second input terminal 2313 may be an inverting input terminal and a non-inverting input terminal, respectively, but are not necessarily limited thereto. For reference, Ra and Rb in FIG. 7 illustrate input and output impedances of the amplifier 231.

This amplifying circuit 530 may receive the noise signal Ns output from the conductive member 150, amplify the noise signal Ns to a degree corresponding to the gain value of the amplifier 231, and output the amplified noise signal Ns to each sensing channel SC. In this case, by adjusting the gain value of the amplifying circuit 530, the magnitude of the noise signal Ns input to the sensing channel SC may be easily adjusted. In some embodiments, the gain value of the amplifying circuit 530 may be adjusted so that the noise component included in the sensing signal Rs output from the first touch electrode member 120 may be effectively canceled inside the sensing channel SC.

Depending on the embodiment, the amplifying circuit 530 may further include a plurality of variable resistors VR1, VR2, VR3, and VR4 connected in parallel between the output terminal 2315 of the amplifier 231 and a predetermined reference power supply GND, such as a ground power supply. As an example, the amplifying circuit 530 may include a number of variable resistors VR1, VR2, VR3, and VR4 corresponding to the number of sensing channels SC.

Depending on the embodiment, each sensing channel SC may be connected to a different variable resistor among the variable resistors VR1, VR2, VR3, and VR4 provided in the amplifying circuit 530. For example, based on FIG. 7, the second input terminal 5713 of the first sensing channel SC corresponding to a fourth electrode row RE4 may be connected to a first variable resistor VR1, and the second input terminal 5713 of the second sensing channel SC corresponding to a third electrode row RE3 may be connected to a second variable resistor VR2. In addition, the second input terminal 5713 of the third sensing channel SC corresponding to a second electrode row RE2 may be connected to a third variable resistor VR3, and the second input terminal 5713 of the fourth sensing channel SC corresponding to a first electrode row RE1 may be connected to a fourth variable resistor VR4.

Figure 8:
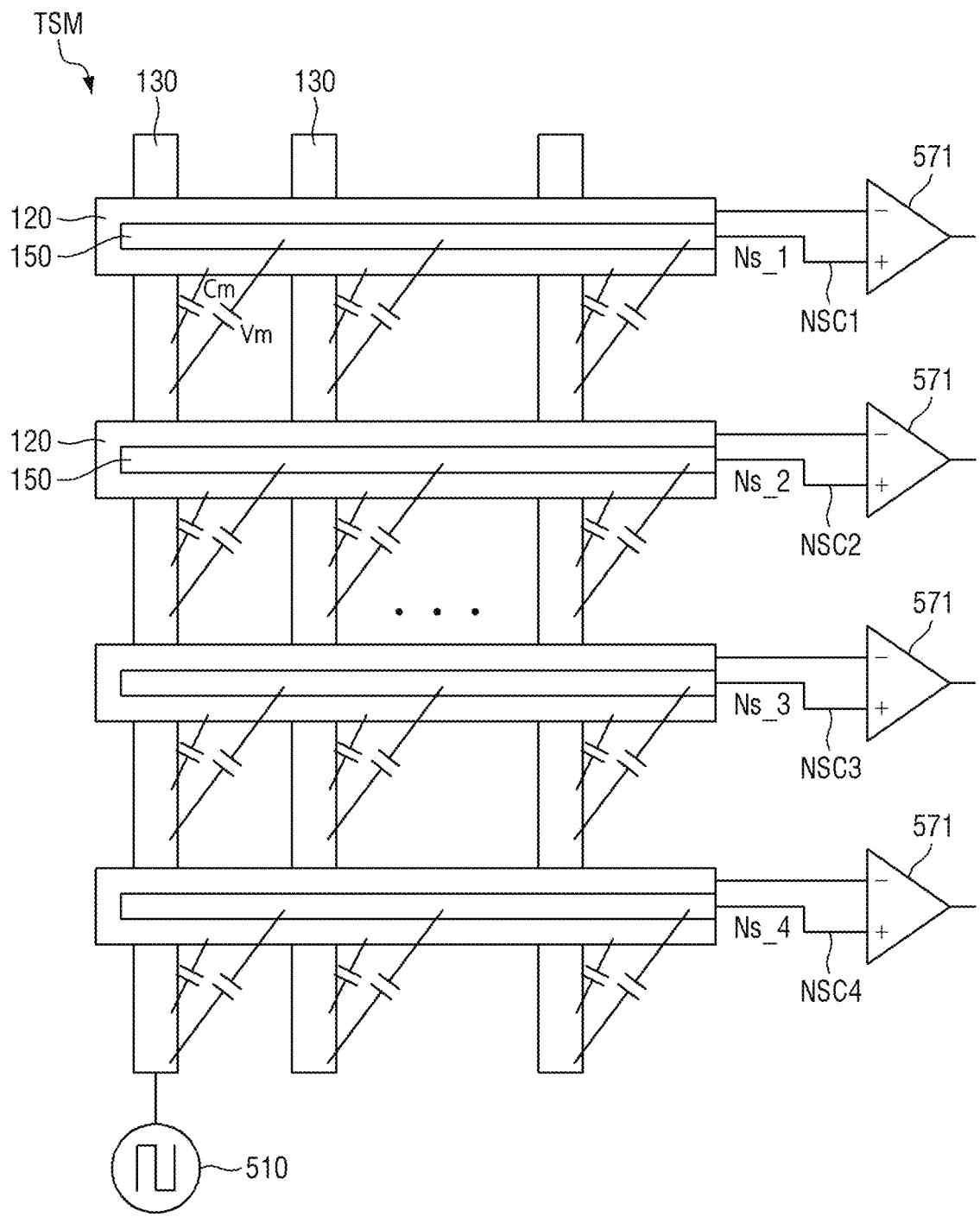
FIG. 8 is a conceptual view schematically illustrating the sensor unit according to an embodiment.

FIG. 8 is a conceptual view schematically illustrating the sensor unit according to an embodiment.

Referring to FIG. 8, the touch sensor TSM, according to an embodiment, includes electrodes overlapping at least one area of the display panel 100. The electrodes of the touch sensor TSM include a plurality of touch driving electrodes 130, a plurality of touch sensing electrodes 120, and a plurality of noise sensing electrodes 150. Here, the plurality of touch driving electrodes 130 are the second touch electrode members 130 described with reference to FIGS. 4 to 7. The plurality of touch sensing electrodes 120 are the first touch electrode members 120 described with reference to FIGS. 4 to 7. The plurality of noise sensing electrodes 150 are the conductive members 150 described with reference to FIGS. 4 to 7.

The plurality of touch driving electrodes 130 and the plurality of touch sensing electrodes 120 intersect each other. For example, in the illustrated example, the plurality of touch driving electrodes 130 extend in a vertical direction and are disposed at intervals from each other in a horizontal direction. In addition, in the illustrated example, the plurality of touch sensing electrodes 120 extend in the horizontal direction and are disposed at intervals from each other in the vertical direction.

The touch driver 510 supplies a driving signal Ts to the plurality of touch driving electrodes 130 to form a mutual capacitance Cm between the touch driving electrode 130 and the touch sensing electrode 120. When the mutual capacitance Cm is formed between the touch driving electrode 130 and the touch sensing electrode 120, a virtual mutual capacitance Vm is formed between the touch driving electrode 130 and the noise sensing electrode 150.

In the touch sensor TSM, a plurality of sensing channels SC for sensing the mutual capacitance Cm and the virtual mutual capacitance Vm are disposed at a rear end of each of the touch sensing electrodes 120. For example, the plurality of sensing channels SC may correspond to the plurality of touch sensing electrodes 120 in a one-to-one manner.

The sensing channels SC may include an amplifier 571 that receives a sensing signal Rs corresponding to a change in mutual capacitance Cm from each touch sensing electrode 120 and amplifies and outputs the received sensing signal Rs. The amplifier 571 receives a noise signal Ns corresponding to the virtual mutual capacitance Vm from each noise sensing electrode 150 and uses the received noise signal Ns as a reference potential for amplifying the sensing signal Rs.

As the plurality of noise sensing electrodes 150 correspond to the plurality of touch sensing electrodes 120 in a one-to-one manner, each of the sensing channels SC includes a plurality of noise sensing channels connected to the noise sensing electrode 150. For example, FIG. 8 illustrates a first noise sensing channel NSC1 receiving a first noise signal Ns_1, a second noise sensing channel NSC2 receiving a second noise signal Ns_2, a third noise sensing channel NSC3 receiving a third noise signal Ns_3, and a fourth noise sensing channel NSC4 receiving a fourth noise signal Ns_4, but the number of noise sensing channels is substantially the same as the number of sensing channels SC.

Here, the first noise signal Ns_1 represents a virtual mutual capacitance Vm sensed by the first noise sensing electrode 150 among the plurality of noise sensing electrodes 150. The second noise signal Ns_2 represents a virtual mutual capacitance Vm sensed by the second noise sensing electrode 150 among the plurality of noise sensing electrodes 150. The third noise signal Ns_3 represents a virtual mutual capacitance Vm sensed by the third noise sensing electrode 150 among the plurality of noise sensing electrodes 150. The fourth noise signal Ns_4 represents a virtual mutual capacitance Vm sensed by the fourth noise sensing electrode 150 among the plurality of noise sensing electrodes 150.

According to an embodiment, the touch driving circuit 400 may obtain a noise sensing signal using all of the plurality of noise sensing channels and compensate for the sensing signal Rs. However, in this case, although touch sensing sensitivity is increased, a problem of increased power consumption may occur. In order to reduce power consumption, the touch driving circuit 400, according to an embodiment, determines a noise level of the display panel 100 in advance and operates according to the determined noise level to obtain the noise sensing signal from at least some of the noise sensing channels.

For example, when the touch driving circuit 400 determines in advance that the noise level of the display panel 100 is relatively high, the touch driving circuit 400 obtains the noise sensing signal using at least a relatively high percentage (e.g., 80%) of the noise sensing channels. For example, when the touch driving circuit 400 determines in advance that the noise level of the display panel is relatively high, the touch driving circuit 400 activates at least a relatively high percentage (e.g., 80%) of the noise sensing channels. Accordingly, the touch sensor TSM may increase touch sensing sensitivity.

For example, when the touch driving circuit 400 determines in advance that the noise level of the display panel 100 is relatively low, the touch driving circuit 400 obtains the noise sensing signal using a relatively low percentage (e.g., 30%) of the noise sensing channels. For example, when the touch driving circuit 400 determines in advance that the noise level of the display panel is relatively low, the touch driving circuit 400 activates only a relatively low percentage (e.g., 30%) of the noise sensing channels. Accordingly, the touch sensor TSM may increase touch sensing sensitivity while reducing power consumption. The touch sensor TSM may reduce power consumption as a rate at which noise sensing channels are deactivated increases.

The touch sensor TSM may dynamically vary the rate at which the noise sensing channels are deactivated depending on the noise level. For example, the touch sensor TSM may divide all noise sensing channels into an even channel group and an odd channel group, and may independently activate or deactivate each group. For example, the touch sensor TSM may divide all noise sensing channels into 2 or more groups disposed at regular intervals, and may independently activate or deactivate each group.

According to an embodiment, the deactivated noise sensing channel may receive the noise sensing signal from an activated noise sensing channel disposed adjacent thereto. For example, when the touch sensor TSM deactivates the even channel group and activates the odd channel group among the noise sensing channels, each noise sensing channel of the even channel group instead receives the noise sensing signal from the odd channel group adjacent thereto. For example, when the first noise sensing channel NSC1 is deactivated, the first noise sensing channel NSC1 may receive the second noise sensing signal Ns_2 from the activated second noise sensing channel NSC2.

Hereinafter, a method for the touch driving circuit 400 to determine the noise level of the display panel 100 in advance will be described with reference to FIGS. 9 to 11.

Figure 9:
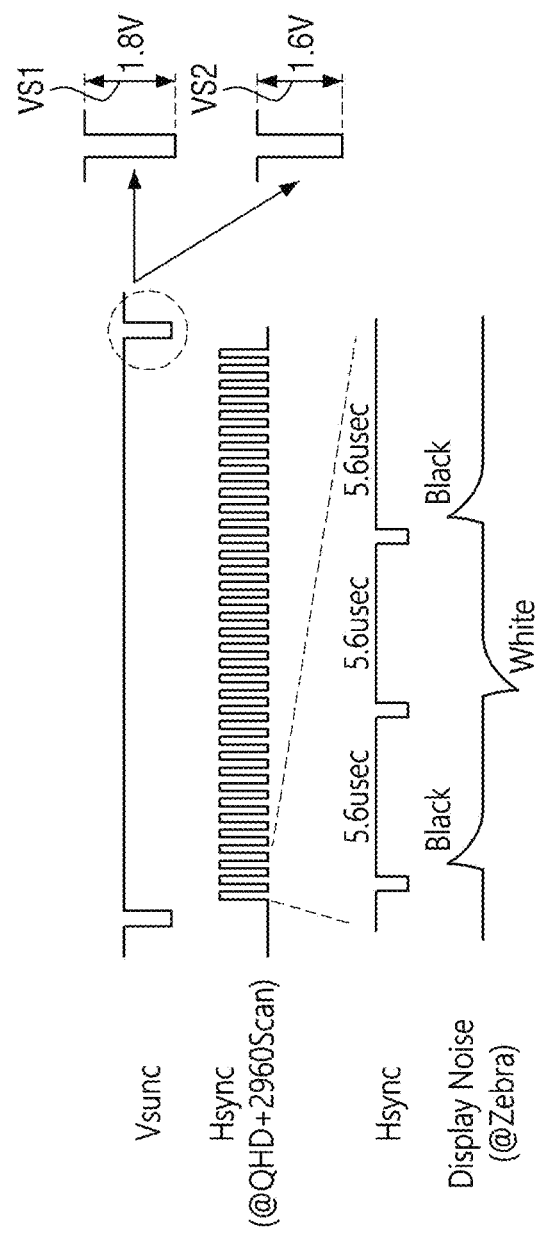
FIG. 9 is a waveform diagram illustrating a vertical synchronization signal according to an embodiment.

FIG. 9 is a waveform diagram illustrating a vertical synchronization signal according to an embodiment.

Referring to FIG. 9, the touch driving circuit 400 may receive a noise level signal indicating a noise level of the display panel 100 from the host 11 that generates image data. The touch driving circuit 400 may be configured to determine the noise level of the display panel 100 based on the noise level signal received from the host 11. Here, the host 11 may be (or may include) an application processor.

The host 11 may analyze image data to be displayed on the display panel 100 and predetermine the noise level of the display panel 100. The host 11 may be configured to determine whether a screen according to the image data is a specific screen and determine the noise level according to the determined result. The specific screen may include, for example, an image with repeated white and black areas (e.g., a zebra image) or an always on display (AOD) image, but the type of the specific screen is not necessarily limited thereto. For example, the host 11 may be configured to determine the noise level as a first level in the case of the always on display (AOD) image, and may be configured to determine the noise level as a second level that is higher than the first level in the case of the zebra image.

According to an embodiment, the host 11 may be configured to determine the noise level depending on whether the screen according to the image data is a still image or a moving image. The host 11 may be configured to determine the noise level as a first level when the screen displays the still image, and may be configured to determine the noise level as a second level that is higher than the first level when the screen displays the moving image.

According to an embodiment, the host 11 may be configured to determine whether an application program executed on a mobile electronic device is a designated program and determine the noise level of the display panel 100 based on the determination. For example, when the executed application program is the designated program, the host 11 may be configured to determine the noise level of the display panel 100 as the second level. For example, if the executed application program is a game program, the host 11 may consider that the noise level generated from the display panel 100 is relatively high and set the noise level to be high. As used herein, the game program is mentioned as an example of the designated program, but the present disclosure is not necessarily limited thereto.

The host 11 may be configured to determine a state of a mobile electronic device to which the display device 10 is applied, for example, whether an electrical charger (e.g., travel adapter) is connected to the mobile electronic device, and determine the noise level according to the determined result.

The host 11 may supply a separate noise level signal indicating the noise level to the display control unit 220 or the touch driving circuit 400 without using the horizontal synchronization signal Hsync. However, as used herein, it will be mainly described that the horizontal synchronization signal Hsync serves as a noise level signal.

The host 11 changes amplitude of the vertical synchronization signal Vsync according to the determined noise level of the display panel 100 and supplies the changed vertical synchronization signal Vsync to the touch driving circuit 400. For example, the embodiment of FIG. 9 illustrates that the host 11 outputs a vertical synchronization signal Vsync with a first amplitude, or the host 11 outputs a vertical synchronization signal Vsync with a second amplitude. The touch driving circuit 400 may indirectly determine the noise level of the display panel 100 by sensing a change in the amplitude of the vertical synchronization signal Vsync.

In FIG. 9, as an example of the change in the amplitude of the vertical synchronization signal Vsync, a first amplitude VS1 of about 1.8V and a second amplitude VS2 of about 1.6V are illustrated, but an amplitude value of the vertical synchronization signal Vsync may be variously changed depending on the number of noise levels of the display panel 100 that are set.

TABLE 1

| Noise Level | Amplitude of Vertical Synchronization Signal Vsync |
| --- | --- |
| First Level (Lowest Noise Level, e.g., FIG. 12) | About 1.5 V |
| Second Level (Noise Level that is Higher Than First Level, e.g., FIG. 13) | About 1.6 V |
| Third Level (Noise Level that is Higher Than Second Level, e.g., FIG. 14) | About 1.7 V |
| Fourth Level (Noise Level that is Higher Than Third Level, e.g., FIG. 15) | About 1.8 V |

Referring to Table 1, the host 11 may divide the determined noise level of the display panel 100 into the first to fourth levels, and may vary the amplitude of the vertical synchronization signal Vsync to about 1.5 V, about 1.6 V, about 1.7 V, or about 1.8 V depending on each of the first to fourth levels. However, the amplitude value of the vertical synchronization signal Vsync illustrated in Table 1 is only an example, and the present disclosure is not necessarily limited thereto. According to an embodiment, the host 11 may vary the amplitude of the vertical synchronization signal Vsync with a 1-frame period. Therefore, the touch driving circuit 400 may predetermine the noise level of the display panel 100 with 1-frame period and vary the number of activated noise sensing channels. According to the embodiment of the present disclosure described above, power consumption may be reduced while increasing touch sensing sensitivity.

Figure 10:
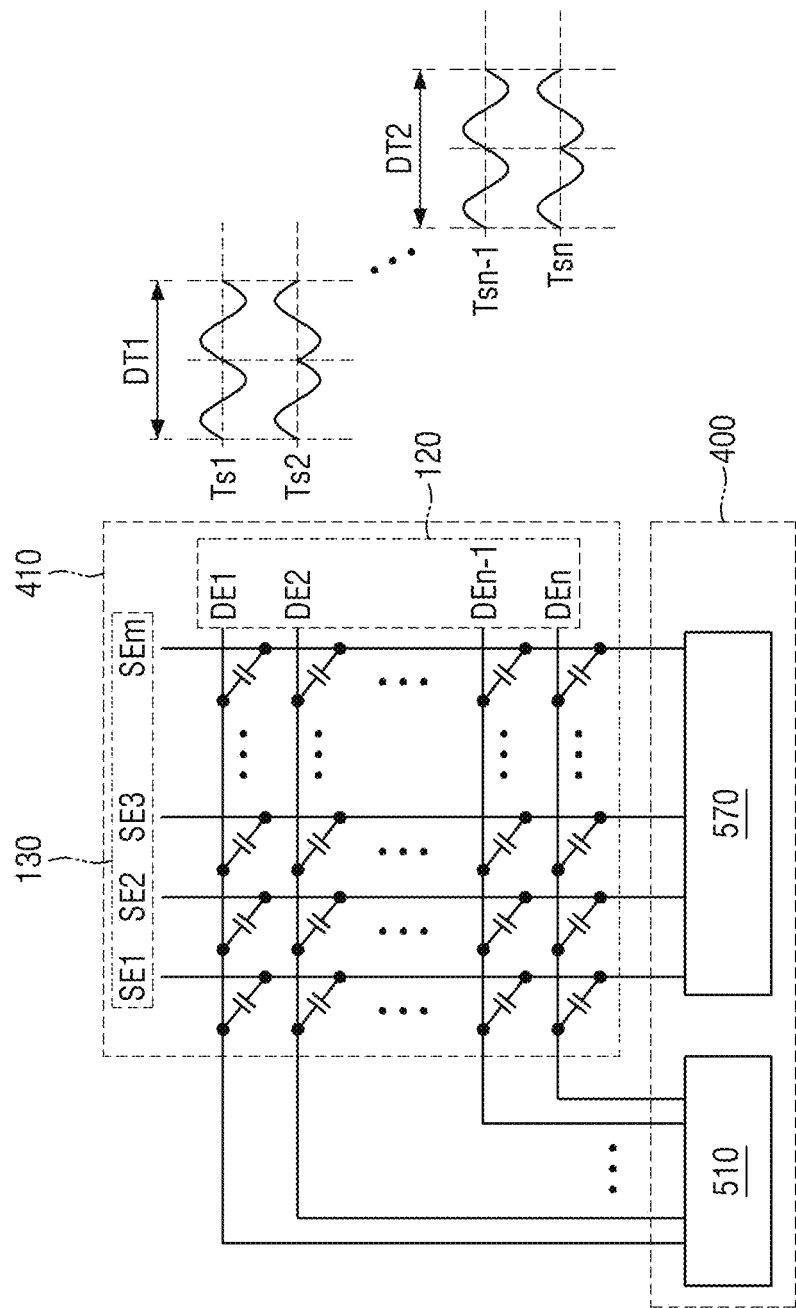
FIG. 10 illustrates a method of driving a sensor unit in a multi-channel driving (MCD) method according to an embodiment.

FIG. 10 illustrates a method of driving a sensor unit in a multi-channel driving (MCD) method according to an embodiment.

Referring to FIG. 10, the touch driving circuit 400, according to an embodiment, may perform multi-channel driving (MCD), which groups the touch driving electrodes 130 into a plurality of driving electrodes 130 and supplies a driving signal for each group.

For example, the driving electrodes 130 (DE1 to Den) may be grouped in units of a plurality of driving electrodes 130 and driven simultaneously, which may be understood as multi-channel driving (MCD). In the embodiment of FIG. 10, the driving electrodes 130 (DE1 to Den) may be driven simultaneously (e.g., 2-MCD) in units of two driving electrodes 130. However, this is an example, and the number of driving electrodes 130 grouped is not necessarily limited thereto.

The touch driver 510 may supply driving signals Ts1 to Tsn to the respective driving electrodes 130 (DE1 to Den). The driving signals Ts1 to Tsn may be preset sinusoidal signals. The driving signal generator 200 may supply first and second driving signals Ts1 and Ts2 satisfying orthogonality to the first and second driving electrodes 130 (DE1 and DE2), respectively, during a first driving period DT1.

The touch driver 510 may supply n−1-th and n-th driving signals Tsn−1 and Tsn satisfying orthogonality to n−1-th and n-th driving electrodes 130 (Den−1 and Den) during a second driving period DT2 different from the first driving period DT1.

The touch detector 570 may receive sensing signals according to the driving signals Ts1 to Tsn from the sensing electrodes 120 (SE1 to Sem). The sensing signals may include mixed capacitance values. A touch processing unit 300 may detect (e.g., determine) a touch position based on sensing signals and a reference code.

According to an embodiment, the touch driving circuit 400 may receive a first noise signal using the noise sensing electrodes 150 adjacent to the touch driving electrodes 130 of the remaining group to which the driving signal is not supplied while supplying the driving signal to the touch driving electrodes 130 of a specific group. For example, the touch driving circuit 400 may obtain the first noise signal using the noise sensing electrodes 150 adjacent to the n-1 and n-th driving electrodes 130 (Den-1 and Den) during the first driving period DT1.

According to an embodiment, the touch driving circuit 400 may be configured to determine the noise level of the display panel 100 using the first noise signal. The touch driving circuit 400 may differentially set the noise level of the display panel 100, as will be described later with reference to FIGS. 12 to 15.

The touch driving circuit 400 selects at least some of the plurality of noise sensing channels according to the noise level of the display panel 100, and receives a second noise signal using the selected noise sensing channel.

The touch driving circuit 400 compensates for the touch sensing signal sensed from the touch sensing electrode 120 based on the second noise signal.

Figure 11:
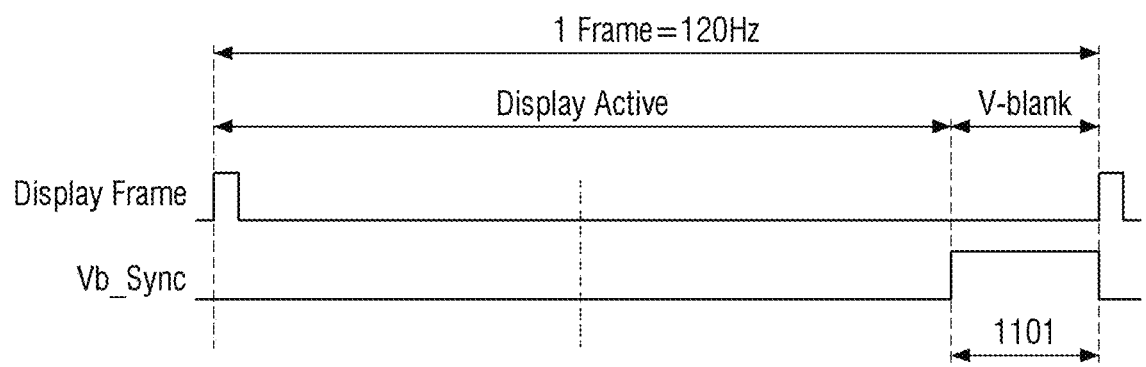
FIG. 11 is a waveform diagram illustrating a vertical blank period of a display panel according to an embodiment.

FIG. 11 is a waveform diagram illustrating a vertical blank period of a display panel 100 according to an embodiment.

Referring to FIG. 11, the touch driving circuit 400 according to an embodiment receives the first noise signal using all of the plurality of noise sensing channels during a vertical blank period V-blank of the display panel 100. For example, a period 1101 during which the touch driving circuit 400 senses the noise signal may be a vertical blank period V-blank of the display panel 100.

According to an embodiment, the touch driving circuit 400 may be configured to determine the noise level of the display panel 100 using the first noise signal. The touch driving circuit 400 may differentially set the noise level of the display panel 100, as will be described later with reference to FIGS. 12 to 15.

The touch driving circuit 400 selects at least some of the plurality of noise sensing channels according to the noise level of the display panel 100, and receives the second noise signal using the selected noise sensing channel.

The touch driving circuit 400 compensates for the touch sensing signal sensed from the touch sensing electrode 120 based on the second noise signal.

FIGS. 12 to 15 are views for describing noise in a display panel 100 according to an embodiment.

FIGS. 12 to 15 illustrate each sensing area of the touch sensor TSM in a matrix form. Each sensing area expresses the degree of change in mutual capacitance Vm sensed from the corresponding sensing area by darkening of a hatching.

For example, in FIGS. 12 to 15, each sensing area expressed as a first darkening indicates a first area 1201 in which the degree of change in mutual capacitance Vm is the lowest.

For example, in FIGS. 12 to 15, each sensing area expressed as a second darkening indicates a second area 1202 in which the degree of change in mutual capacitance Vm is higher than that of the first area 1201.

For example, in FIGS. 12 to 15, each sensing area expressed as a third darkening indicates a third area 1203 in which the degree of change in mutual capacitance Vm is higher than that of the second area 1202.

For example, in FIGS. 12 to 15, each sensing area expressed as a fourth darkening indicates a fourth area 1204 in which the degree of change in mutual capacitance Vm is higher than that of the third area 1203.

Figure 12:
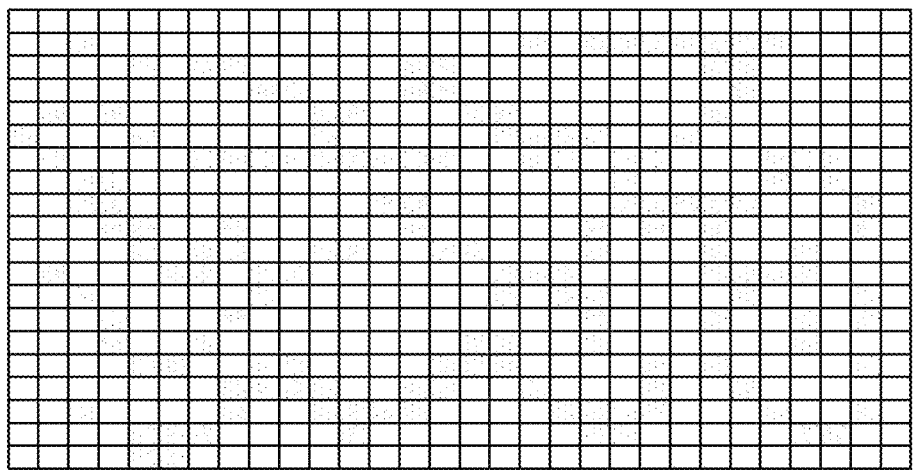
FIGS. 12 to 15 are views for describing noise in a display panel according to an embodiment.
Figure 13:
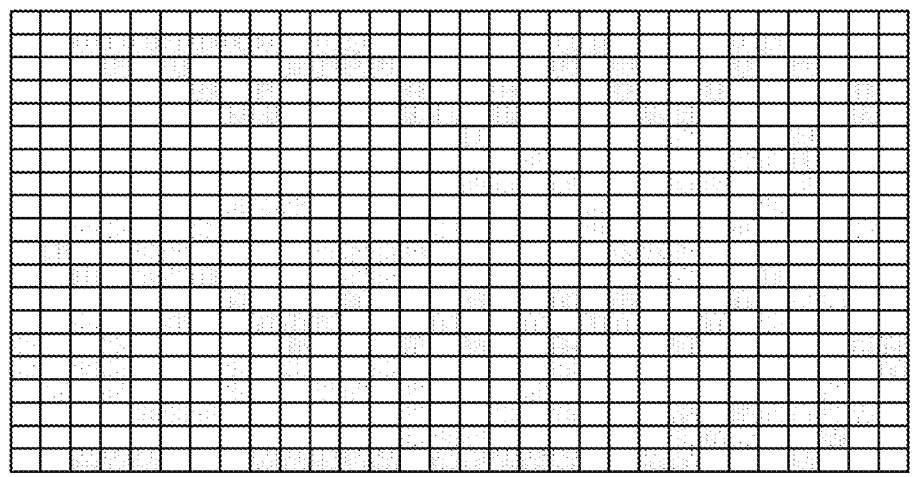
Figure 14:
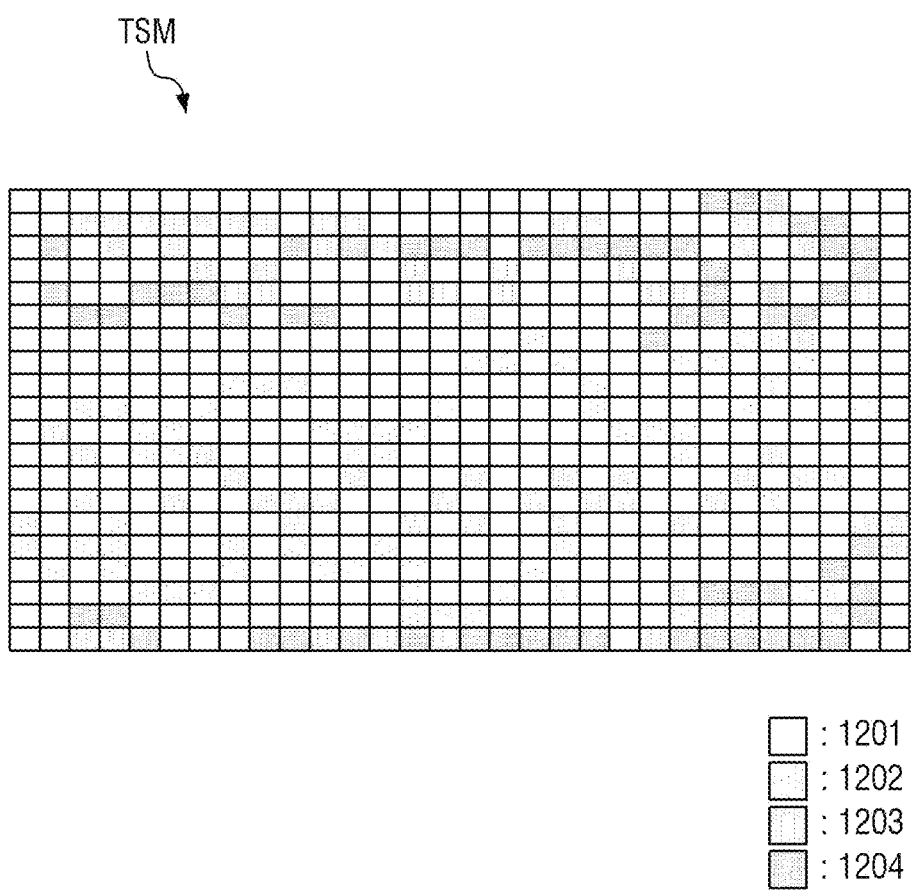
Figure 15:
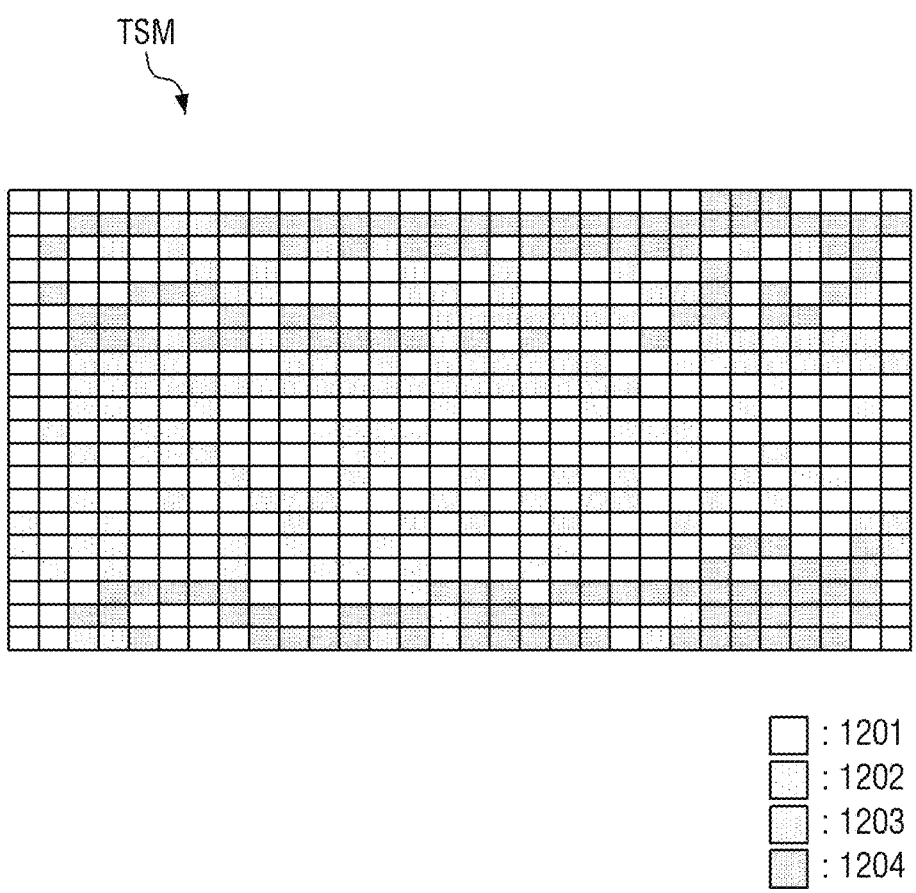

As illustrated in FIGS. 12 to 15, from FIG. 12 to FIG. 15, in the entire area of the touch sensor TSM, a proportion of the third area 1203 and the fourth area 1204 increases, and a proportion of the first area 1201 and the second area 1202 decreases. Therefore, FIG. 12 illustrates a first level with the lowest noise level, FIG. 13 illustrates a second level that is higher than the first level, FIG. 14 illustrates a third level that is higher than the second level, and FIG. 15 illustrates a fourth level that is higher than the third level.

In some embodiments, the noise levels as in FIGS. 12 to 15 are determined by an application that is the host 11. In addition, the host 11 may be configured to transmit a noise level signal corresponding to the noise level to the touch driving circuit 400.

In some embodiments, the noise levels as in FIGS. 12 to 15 are determined by sensing noise using a non-driving channel when the touch driving circuit 400 performs multi-channel driving (MCD).

In some embodiments, the noise levels as in FIGS. 12 to 15 are determined by the touch driving circuit 400 sensing noise during the vertical blank period V-blank of the display panel 100.

Figure 16:
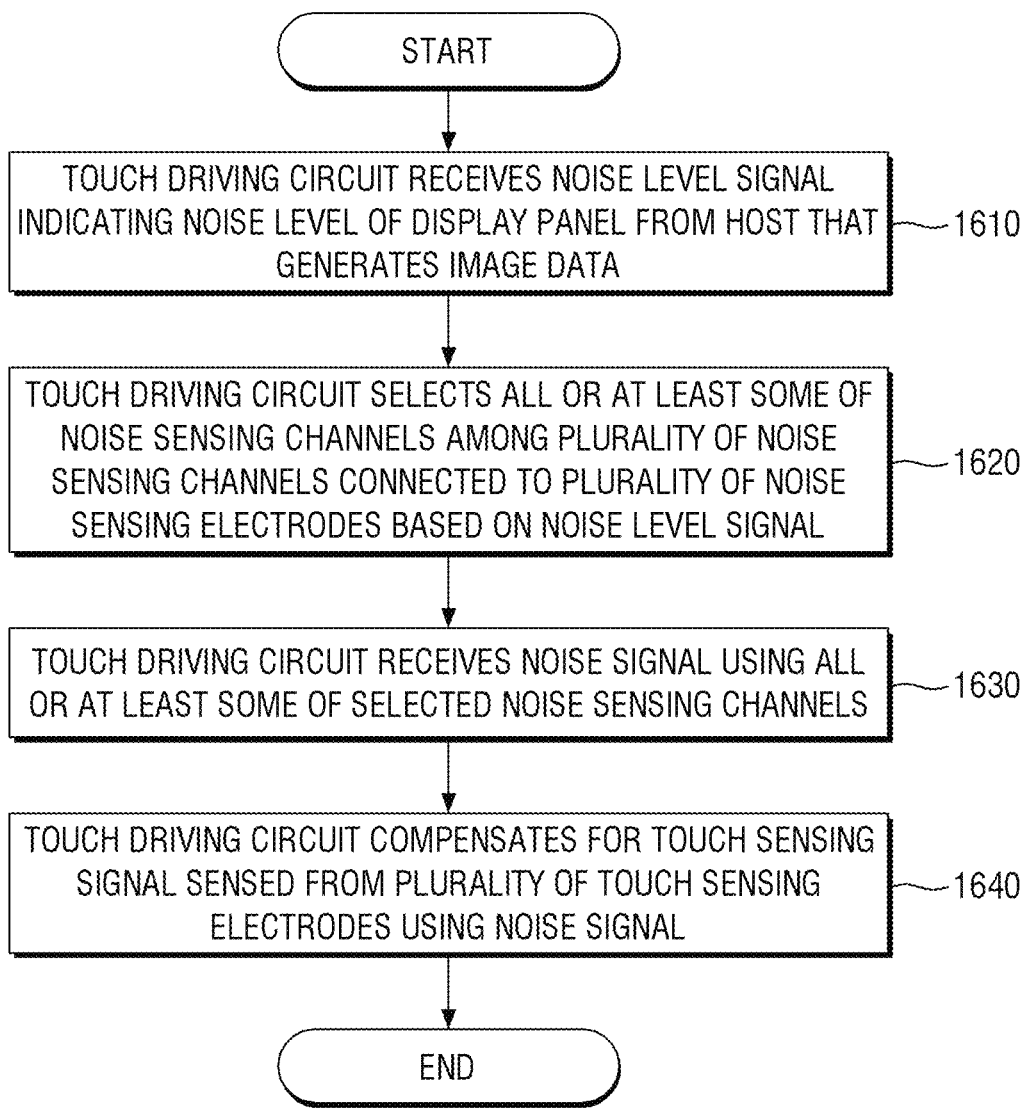
FIG. 16 is a flowchart illustrating a method of driving a display device according to an embodiment.

FIG. 16 is a flowchart illustrating a method of driving a display device according to an embodiment.

In operation 1610, the touch driving circuit 400, according to an embodiment, receives a noise level signal indicating a noise level of the display panel 100 from the host 11 that generates image data.

The host 11 may analyze image data to be displayed on the display panel 100 and predetermine the noise level of the display panel 100. The host 11 may be configured to determine whether a screen according to the image data is a specific screen and determine the noise level according to the determined result. The specific screen may include, for example, an image with repeated white and black areas (e.g., a zebra image) or an always on display (AOD) image, but the type of the specific screen is not necessarily limited thereto.

The host 11 may be configured to determine a state of a mobile electronic device to which the display device 10 is applied, for example, whether an electrical charger (e.g., travel adapter) is connected to the mobile electronic device, and determine the noise level according to the determined result.

The host 11 may supply a separate noise level signal indicating the noise level to the display control unit 220 or the touch driving circuit 400 without using the horizontal synchronization signal Hsync. However, in the following, it will be mainly described that the horizontal synchronization signal Hsync serves as a noise level signal.

The host 11 changes amplitude of the vertical synchronization signal Vsync according to the determined noise level of the display panel 100 and supplies the changed vertical synchronization signal Vsync to the touch driving circuit 400. For example, the embodiment of FIG. 9 illustrates that the host 11 outputs a vertical synchronization signal Vsync with a first amplitude, or the host 11 outputs a vertical synchronization signal Vsync with a second amplitude. The touch driving circuit 400 may indirectly determine the noise level of the display panel 100 by sensing a change in the amplitude of the vertical synchronization signal Vsync.

In operation 1620, the touch driving circuit 400 according to an embodiment selects at least some of the noise sensing channels among the plurality of noise sensing channels connected to the plurality of noise sensing electrodes 150 based on the noise level signal.

The touch driving circuit 400 may vary the number of noise sensing channels selected according to the noise level. For example, the number of noise sensing channels set by the touch driving circuit 400 may be as illustrated in Table 2. However, Table 2 is only an example, and the present disclosure is not necessarily limited thereto.

TABLE 2

| Noise Level | Selected Noise Sensing Channel |
| --- | --- |
| First Level (Lowest Noise Level, e.g., FIG. 12) | About 40% of All Channels |
| Second Level (Noise Level that is Higher Than First Level, e.g., FIG. 13) | About 60% of All Channels |
| Third Level (Noise Level that is Higher Than Second Level, e.g., FIG. 14) | About 80% of All Channels |
| Fourth Level (Noise Level that is Higher Than Third Level, e.g., FIG. 15) | All Channels |

Referring to Table 2, when the noise level is the highest fourth level, the touch driving circuit 400 may receive the noise signal using all noise sensing channels. The touch driving circuit 400 is configured to reduce the proportion of the selected noise sensing channels (i.e., the activated noise sensing channels) from the fourth level to the first level. In operation 1630, the touch driving circuit 400, according to an embodiment, receives the noise signal using at least some of the selected noise sensing channels. For example, the touch driving circuit 400 dynamically varies the number of noise sensing channels activated according to preset rules as illustrated in Table 2.

In operation 1640, the touch driving circuit 400, according to an embodiment, compensates for the touch sensing signal sensed from the plurality of touch sensing electrodes 120 using the noise signal.

Figure 17:
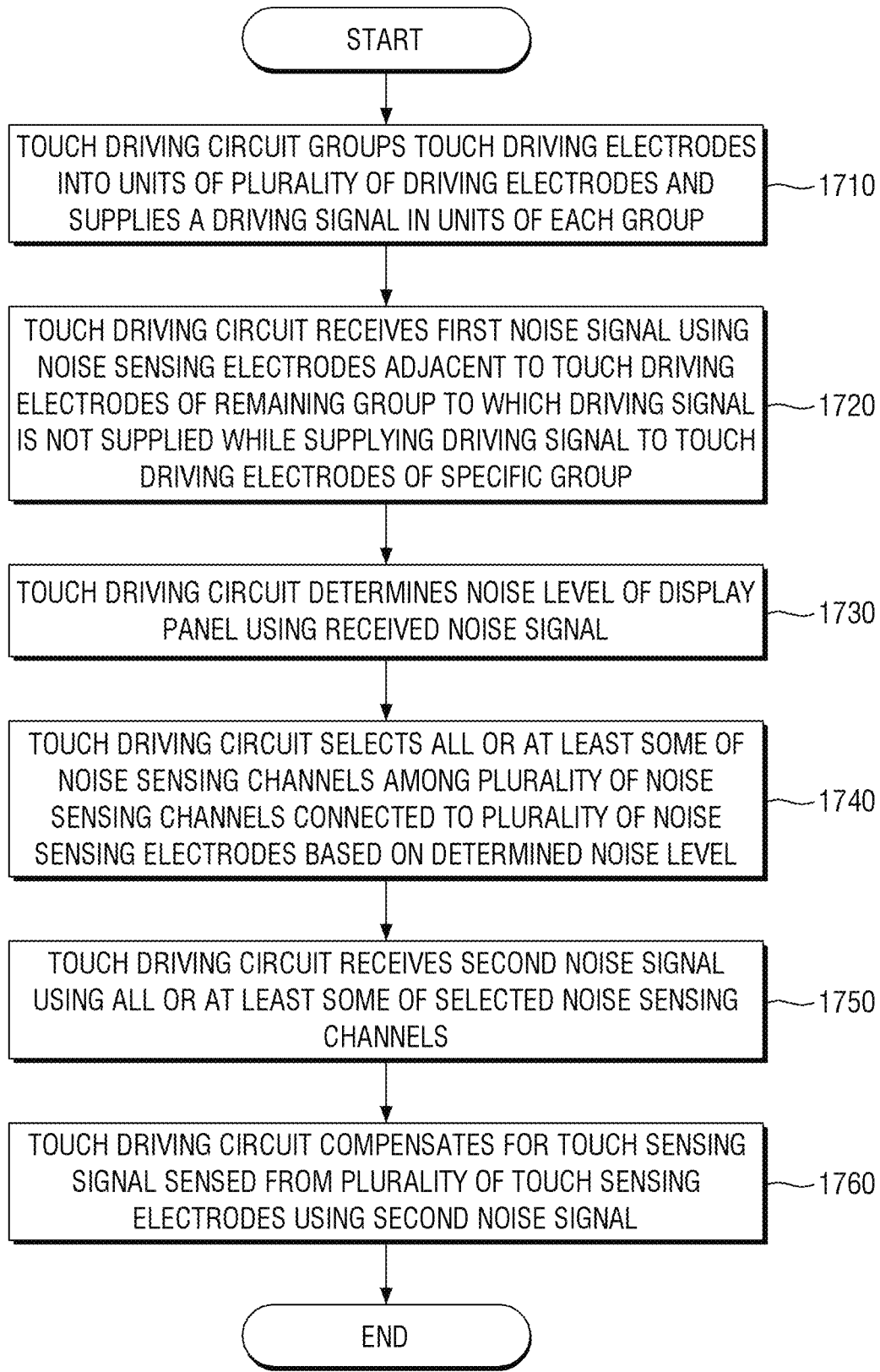
FIG. 17 is a flowchart illustrating a method of compensating for noise in a display panel when driving a sensor unit in a multi-channel driving method according to an embodiment.

FIG. 17 is a flowchart illustrating a method of compensating for noise in a display panel 100 when driving a sensor unit in a multi-channel driving method according to an embodiment.

In operation 1710, the touch driving circuit 400, according to an embodiment, groups the touch driving electrodes 130 into units of a plurality of driving electrodes 130 and supplies a driving signal in units of each group.

In operation 1720, the touch driving circuit 400, according to an embodiment, receives a first noise signal using the noise sensing electrodes 150 adjacent to the touch driving electrodes 130 of the remaining group to which the driving signal is not supplied while supplying the driving signal to the touch driving electrodes 130 of a specific group.

In operation 1730, the touch driving circuit 400, according to an embodiment, determines a noise level of the display panel 100 using the received noise signal, for example, the first noise signal. The noise level may be determined as one of the plurality of noise levels, as described with reference to Table 1 and FIGS. 12 to 15.

In operation 1740, the touch driving circuit 400, according to an embodiment, selects at least some of the noise sensing channels among the plurality of noise sensing channels connected to the plurality of noise sensing electrodes 150 based on the determined noise level. As described with reference to Table 2, the touch driving circuit 400 may select at least some of the noise sensing channels according to the noise level.

In operation 1750, the touch driving circuit 400, according to an embodiment, receives a second noise signal using at least some of the selected noise sensing channels. The second noise signal, unlike the first noise signal, is a noise signal obtained through at least a partially activated noise sensing channel. Therefore, when the touch driving circuit 400 obtains the second noise signal, power consumption may be reduced.

In operation 1760, the touch driving circuit 400, according to an embodiment, compensates for the touch sensing signal sensed from the plurality of touch sensing electrodes 120 using the second noise signal.

Figure 18:
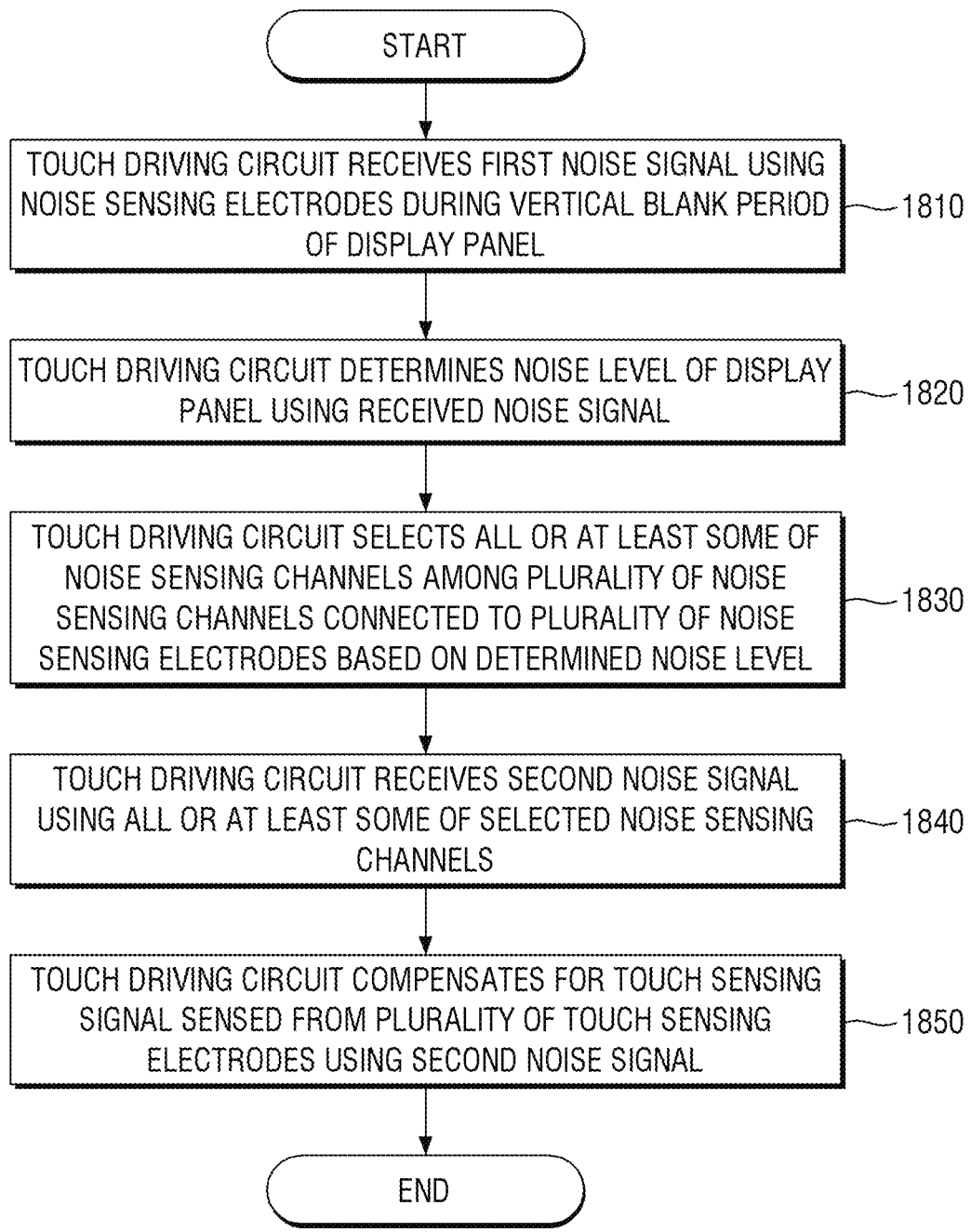
FIG. 18 is a flowchart illustrating a method of compensating for noise in a display panel using a vertical blank period of the display panel according to an embodiment.

FIG. 18 is a flowchart illustrating a method of compensating for noise in a display panel using a vertical blank period V-blank of the display panel 100 according to an embodiment.

In operation 1810, the touch driving circuit 400, according to an embodiment, receives the first noise signal using the noise sensing electrodes 150 during a vertical blank period V-blank of the display panel 100.

In operation 1820, the touch driving circuit 400, according to an embodiment, determines a noise level of the display panel 100 using the received noise signal, for example, the first noise signal. The noise level may be determined as one of the plurality of noise levels, as described with reference to Table 1 and FIGS. 12 to 15.

In operation 1830, the touch driving circuit 400, according to an embodiment, selects at least some of the noise sensing channels among the plurality of noise sensing channels connected to the plurality of noise sensing electrodes 150 based on the determined noise level. As described with reference to Table 2, the touch driving circuit 400 may select at least some of the noise sensing channels according to the noise level.

In operation 1840, the touch driving circuit 400, according to an embodiment, receives a second noise signal using at least some of the selected noise sensing channels. The second noise signal, unlike the first noise signal, is a noise signal obtained through at least a partially activated noise sensing channel. Therefore, when the touch driving circuit 400 obtains the second noise signal, power consumption may be reduced.

In operation 1850, the touch driving circuit 400, according to an embodiment, compensates for the touch sensing signal sensed from the plurality of touch sensing electrodes 120 using the second noise signal.

In concluding the detailed description, those skilled in the art will appreciate that many variations and modifications can be made to the preferred embodiments without substantially departing from the principles of the present invention. Therefore, the disclosed embodiments of the invention may be used in a generic and descriptive sense and do not necessarily limit the invention thereto.

What is claimed is:
1. A display device, comprising:
   a display panel;
   a sensor unit overlapping the display panel and including a plurality of touch driving electrodes, a plurality of touch sensing electrodes, and a plurality of noise sensing electrodes; and
   a touch driving circuit configured to supply a driving signal to the plurality of touch driving electrodes and receive a touch sensing signal from the plurality of touch sensing electrodes,
   wherein the touch driving circuit is further configured to:
      receive a noise level signal indicating a noise level of the display panel from a host that generates image data, select at least some noise sensing channels, among a
plurality of noise sensing channels connected to
the plurality of noise sensing electrodes, based on
the noise level signal,
receive a noise signal using at least some of the selected
noise sensing channels, and
compensate for the touch sensing signal using the
received noise signal.

2. The display device of claim 1, wherein the host is configured to determine whether a mobile electronic device to which the display device is applied is in a designated state, and determine the noise level based on the determined designated state of the mobile electronic device, and
wherein the designated state includes a state in which an electric charger is connected to the mobile electronic device.

3. The display device of claim 2, wherein the noise level signal includes a vertical synchronization signal with variable amplitude.

4. The display device of claim 3, wherein the vertical synchronization signal has a first amplitude when the noise level is a first level, and has a second amplitude when the noise level is a second level that is higher than the first level.

5. The display device of claim 2, wherein the host is configured to determine whether a screen according to the image data is a specific screen, and determine the noise level of the display panel based on the result of determining whether the screen displays the specific screen.

6. The display device of claim 5, wherein when the screen displays an always on display (AOD) image, the host is configured to determine the noise level of the display panel as a first level, and
when the screen displays an image with repeated white and black areas, the host is configured to determine the noise level of the display panel as a second level that is higher than the first level.

7. The display device of claim 5, wherein when the screen displays a still image, the host is configured to determine the noise level of the display panel as a first level, and
when the screen displays a moving image, the host is configured to determine the noise level of the display panel as a second level that is higher than the first level.

8. The display device of claim 7, wherein the host is configured to determine whether an application program executed on the mobile electronic device is a designated program, and determine the noise level of the display panel as the second level when the executed application program is the designated program.

9. The display device of claim 1, wherein the touch driving circuit is configured to:
group the plurality of touch driving electrodes into units of a plurality of driving electrodes and supply the driving signal in units of each group,
receive a first noise signal using noise sensing electrodes adjacent to touch driving electrodes of the remaining group to which the driving signal is not supplied, while supplying the driving signal to a specific group,
determine the noise level of the display panel using the received first noise signal,
select at least some noise sensing channels among a plurality of noise sensing channels based on the determined noise level,
receive a second noise signal using at least some of the selected noise sensing channels, and
compensate for the touch sensing signal using the received second noise signal.

10. The display device of claim 1, wherein the touch driving circuit is configured to:
receive a first noise signal using the plurality of noise sensing electrodes during a vertical blank period of the display panel,
determine the noise level of the display panel using the received first noise signal,
select at least some noise sensing channels among a plurality of noise sensing channels based on the determined noise level,
receive a second noise signal using at least some of the selected noise sensing channels, and
compensate for the touch sensing signal using the received second noise signal.

11. A mobile electronic device, comprising:
an application processor;
a display panel;
a sensor unit overlapping the display panel and including a plurality of touch driving electrodes, a plurality of touch sensing electrodes, and a plurality of noise sensing electrodes; and
a touch driving circuit configured to supply a driving signal to the plurality of touch driving electrodes and receive a touch sensing signal from the plurality of touch sensing electrodes,
wherein the touch driving circuit is configured to:
receive a noise level signal indicating a noise level of the display panel from the application processor,
select at least some noise sensing channels among a plurality of noise sensing channels connected to the plurality of noise sensing electrodes, based on the noise level signal,
receive a noise signal using at least some of the selected noise sensing channels, and
compensate for the touch sensing signal using the received noise signal.

12. The mobile electronic device of claim 11, wherein the application processor is configured to determine whether the mobile electronic device to which the mobile electronic device is applied is in a designated state, and determine the noise level based on the determined designated state of the mobile electronic device, and
wherein the designated state includes a state in which an electric charger is connected to the mobile electronic device.

13. The mobile electronic device of claim 12, wherein the noise level signal includes a vertical synchronization signal with variable amplitude.

14. The mobile electronic device of claim 13, wherein the vertical synchronization signal has a first amplitude when the noise level is a first level, and has a second amplitude when the noise level is a second level that is higher than the first level.

15. The mobile electronic device of claim 12, wherein the application processor is configured to determine whether a screen according to the image data is a specific screen, and determines the noise level of the display panel based on the result of determining whether the screen displays the specific screen.

16. The mobile electronic device of claim 15, wherein when the screen displays an always on display (AOD) image, the application processor is configured to determine the noise level of the display panel as a first level, and
when the screen displays a repeated white and black areas, the application processor is configured to determine the noise level of the display panel as a second level that is higher than the first level.

17. The mobile electronic device of claim 15, wherein when the screen displays a still image, the application processor is configured to determine the noise level of the display panel as a first level, and
when the screen displays a moving image, the application processor is configured to determine the noise level of the display panel as a second level that is higher than the first level.

18. The mobile electronic device of claim 17, wherein the application processor is configured to determine whether an application program executed on the mobile electronic device is a designated program, and determine the noise level of the display panel as the second level when the executed application program is the designated program.

19. The mobile electronic device of claim 11, wherein the touch driving circuit is configured to:
group the plurality of touch driving electrodes into units of a plurality of driving electrodes and supply the driving signal in units of each group,
receive a first noise signal using noise sensing electrodes adjacent to touch driving electrodes of the remaining group to which the driving signal is not supplied, while supplying the driving signal to a specific group,
determine the noise level of the display panel using the received first noise signal,
select at least some noise sensing channels among a plurality of noise sensing channels based on the determined noise level,
receive a second noise signal using at least some of the selected noise sensing channels, and
compensate for the touch sensing signal using the received second noise signal.

20. The mobile electronic device of claim 11, wherein the touch driving circuit is configured to:
receive a first noise signal using the plurality of noise sensing electrodes during a vertical blank period of the display panel,
determine the noise level of the display panel using the received first noise signal,
select at least some noise sensing channels among a plurality of noise sensing channels based on the determined noise level,
receive a second noise signal using at least some of the selected noise sensing channels, and
compensate for the touch sensing signal using the received second noise signal.

* * * * *